US012132859B2

(12) United States Patent
Giagnocavo et al.

(10) Patent No.: US 12,132,859 B2
(45) Date of Patent: Oct. 29, 2024

(54) 911 CALL ENHANCEMENT

(71) Applicant: CenturyLink Intellectual Property LLC, Broomfield, CO (US)

(72) Inventors: Patrick Giagnocavo, Littleton, CO (US); Michael Stillman, Colorado Springs, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 193 days.

(21) Appl. No.: 17/735,874

(22) Filed: May 3, 2022

(65) Prior Publication Data

US 2023/0239397 A1    Jul. 27, 2023

Related U.S. Application Data

(60) Provisional application No. 63/302,672, filed on Jan. 25, 2022.

(51) Int. Cl.
*H04M 3/42* (2006.01)
*G06Q 50/26* (2012.01)
*H04M 3/51* (2006.01)

(52) U.S. Cl.
CPC ........ *H04M 3/42042* (2013.01); *G06Q 50/26* (2013.01); *H04M 3/42068* (2013.01); *H04M 3/5116* (2013.01); *H04M 2242/04* (2013.01)

(58) Field of Classification Search
CPC ......... H04M 3/42042; H04M 3/42068; H04M 3/5116; H04M 2242/04; G06Q 50/26; H04W 4/90; H04W 4/029; H04W 76/50; H04W 4/02; G08B 25/016; G08B 21/02; G08B 21/043; G08B 21/0446; G08B 21/0492; G08B 21/0453; G08B 25/10; G08B 25/08

See application file for complete search history.

(56) References Cited

U.S. PATENT DOCUMENTS

| | | | | |
|---|---|---|---|---|
| 9,467,833 | B2* | 10/2016 | Chin | H04W 4/90 |
| 9,801,038 | B1* | 10/2017 | Krysztal | H04L 67/306 |
| 11,411,930 | B1* | 8/2022 | Bernier | H04L 63/0428 |
| 2008/0226039 | A1* | 9/2008 | Goldman | H04M 3/527 |
| | | | | 379/45 |
| 2010/0195805 | A1* | 8/2010 | Zeigler | H04M 3/5116 |
| | | | | 379/45 |
| 2011/0111728 | A1* | 5/2011 | Ferguson | H04W 4/90 |
| | | | | 455/404.1 |

(Continued)

*Primary Examiner* — Akelaw Teshale

(57) ABSTRACT

Novel tools and techniques are provided for implementing enhanced 911 call functionalities. In various embodiments, in response to receiving a 911 call request from a caller using a calling device associated with an originating telephone number ("TN"), a computing system may determine whether a user profile associated with the caller and/or the originating TN contains registered third parties on a 911 call notification list. Based on a determination that the user profile contains at least one registered third party on the 911 call notification list associated with the caller and/or the originating TN, the computing system may send a message to each of the at least one registered third party indicating that the caller has called 911, and/or may establish a listen-in only bridged connection, a full bridge connection, or a shared communication to the 911 call for each registered third party.

20 Claims, 10 Drawing Sheets

(56) References Cited

U.S. PATENT DOCUMENTS

| | | | |
|---|---|---|---|
| 2012/0178404 A1* | 7/2012 | Chin | H04W 4/14 |
| | | | 455/404.1 |
| 2012/0225633 A1* | 9/2012 | Nichols | G08B 13/1427 |
| | | | 340/539.32 |
| 2016/0071399 A1* | 3/2016 | Altman | H04M 1/72421 |
| | | | 340/539.11 |
| 2017/0026504 A1* | 1/2017 | Nichols | A61B 5/746 |

* cited by examiner

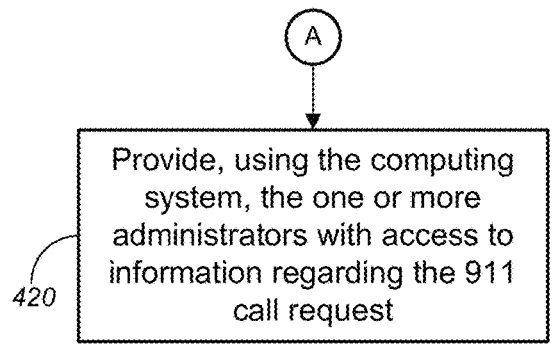
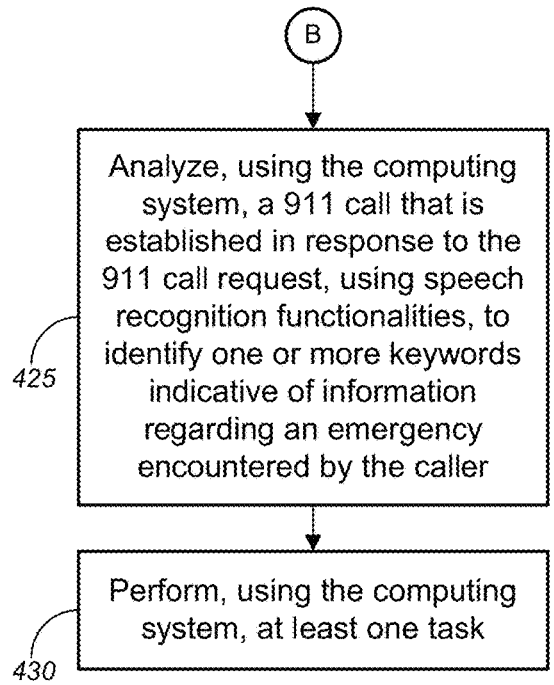
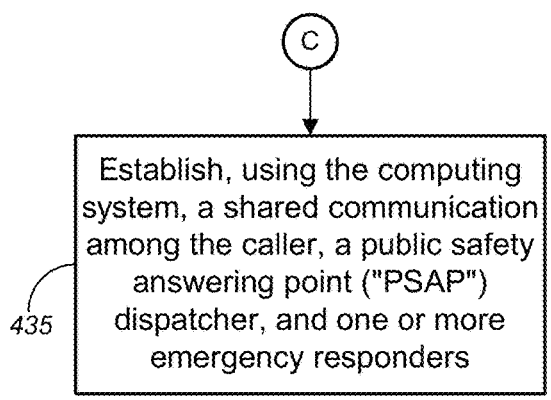
Fig. 4B
Fig. 4C
Fig. 4D

911 CALL ENHANCEMENT

CROSS-REFERENCES TO RELATED APPLICATIONS

This application claims priority to U.S. Patent Application Ser. No. 63/302,672 (the "'672 Application"), filed Jan. 25, 2022, by Patrick Giagnocavo et al., entitled, "911 Call Enhancement," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing 911 call functionalities, and, more particularly, to methods, systems, and apparatuses for implementing enhanced 911 call functionalities.

BACKGROUND

For conventional 911 calls, a single bi-directional call is established between the caller and a local public safety answering point ("PSAP"), without anyone else being alerted or involved in any resultant 911 call, even if one or more other parties may be helpful for addressing the emergency faced by the caller. Also, conventional approaches may provide no recourse for the caller in the case that the 911 call attempt fails.

Hence, there is a need for more robust and scalable solutions for implementing 911 call functionalities, and, more particularly, to methods, systems, and apparatuses for implementing enhanced 911 call functionalities.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4F are flow diagrams illustrating a method for implementing enhanced 911 call functionalities, in accordance with various embodiments.

DETAILED DESCRIPTION OF CERTAIN EMBODIMENTS

Overview

Figure 1:
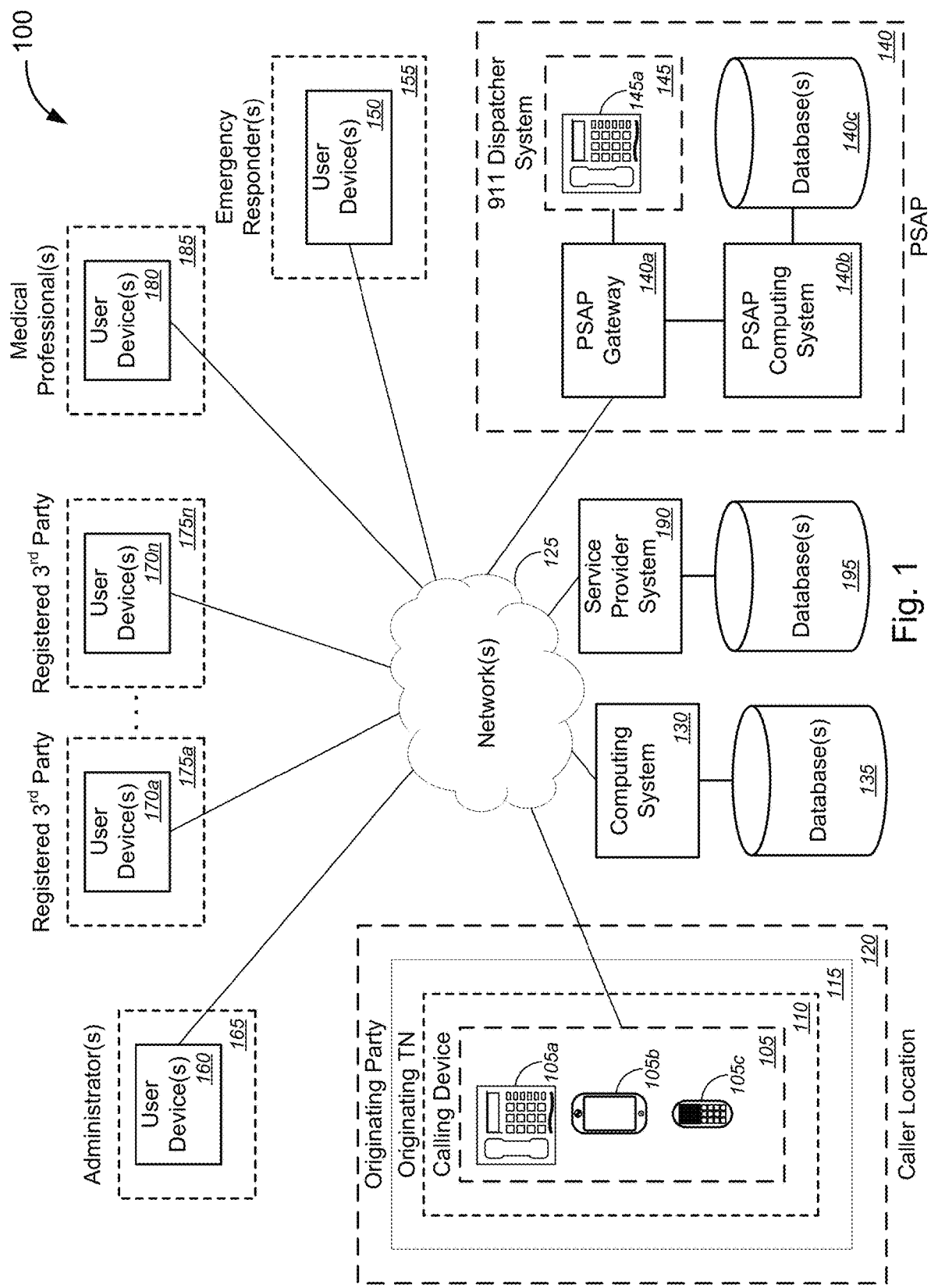
FIG. 1 is a schematic diagram illustrating a system for implementing enhanced 911 call functionalities, in accordance with various embodiments.

Various embodiments provide tools and techniques for implementing 911 call functionalities, and, more particularly, to methods, systems, and apparatuses for implementing enhanced 911 call functionalities.

In various embodiments, in response to receiving a 911 call request from a caller using a calling device associated with an originating telephone number ("TN"), a computing system may determine whether a user profile associated with at least one of the caller or the originating TN contains one or more registered third parties on a 911 call notification list. Based on a determination that the user profile contains at least one registered third party on the 911 call notification list associated with the at least one of the caller or the originating TN, the computing system may send a first message to each of the at least one registered third party indicating that the caller has called 911.

In some embodiments, the computing system may comprise at least one of a call server, a call controller, a call manager, a public safety answering point ("PSAP") computing system, a network service provider computing system, a server computer over a network, a cloud-based computing system, or a distributed computing system, and/or the like.

According to some embodiments, the user profile associated with the at least one of the caller or the originating TN may be accessible and updateable by one or more administrators associated with the originating TN. In some instances, the caller may be an individual. In such cases, the one or more administrators may each comprise at least one of a guardian of the caller, an adult child of the caller, a parent of the caller, a grandparent of the caller, a sibling of the caller, or another relative of the caller, and/or the like. Also in such cases, the one or more registered third parties on the 911 call notification list associated with the at least one of the caller or the originating TN may each comprise at least one of the one or more administrators, an agent of the caller, a guardian of the caller, an adult child of the caller, a parent of the caller, a grandparent of the caller, a sibling of the caller, another relative of the caller, a friend of the caller, a neighbor of the caller, a doctor of the caller, a pharmacist of the caller, or a language translation service, and/or the like.

Alternatively, the caller may be one of an employee, a contractor, an owner, or a guest or visitor, and/or the like, of an entity associated with the originating TN. In such cases, the one or more administrators may each comprise at least one of security personnel, a head of security, an executive assistant, a manager, an executive officer, a board member, or an owner of the entity, and/or the like. Also in such cases, the one or more registered third parties on the 911 call notification list may each comprise at least one of the one or more administrators, an agent of the entity, security personnel of the entity, a head of security of the entity, an executive assistant of the entity, a manager of the entity, an executive officer of the entity, a board member of the entity, an owner of the entity, an attorney at a law firm representing the entity, an in-house attorney for the entity, one or more other employees of the entity working at a location associated with the 911 call request, one or more other employees of the entity working at a different location, or one or more other situation responders of the entity, and/or the like.

In some embodiments, the computing system may provide the one or more administrators with access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may comprise at least one of access during the 911 call that is established in response to the 911 call request or access after the 911 call that had been established in response to the 911 call request has ended. Alternatively, or additionally, the access may comprise at least one of access via a web portal, access via a software application ("app"), or access via an interactive voice response ("IVR") system, and/or the like.

According to some embodiments, sending the first message to each of the at least one registered third party indicating that the caller has called 911 may comprise sending at least one of an e-mail message, a short message service ("SMS") message, a multimedia messaging service ("MMS") message, or a text message to each of the at least one registered third party indicating that the caller has called 911, and/or the like.

According to some embodiments, the computing system may perform at least one of: establishing a listen-in only bridged audio connection to a 911 call that is established in response to the 911 call request for each of the at least one registered third party; establishing a full conference bridge to the 911 call that is established in response to the 911 call request for each of the at least one registered third party; sending a second message containing at least one of a copy of a recording of the 911 call that is established in response to the 911 call request or a link to the copy of the recording of the 911 call; or sending a group message to a plurality of registered third parties among the one or more registered third parties on the 911 call notification list; and/or the like.

In some embodiments, the computing system may establish a shared communication among the caller, a public safety answering point ("PSAP") dispatcher, and one or more emergency responders. The one or more emergency responders may comprise at least one of one or more police officers, one or more firefighters, one or more emergency medical technicians ("EMTs"), one or more paramedics, or one or more language translators, and/or the like. In some cases, the shared communication may comprise at least one of: a full conference bridge; a group e-mail message; a group short message service ("SMS") message; a group multimedia messaging service ("MMS") message; or a group text message; and/or the like. In some instances, the group e-mail message, the group SMS message, the group MMS message, or the group text message may each comprise at least one of information regarding the caller, information regarding medical status of the caller, information regarding medication needs of the caller, information regarding one or more other individuals at a geographical location associated with at least one of the caller or the originating TN, information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

According to some embodiments, based on a determination that a 911 call fails to be established in response to the 911 call request, the computing system may perform at least one of: alerting a 911 service provider indicating a failed 911 call; attempting to re-establish the 911 call; or re-routing call connections to re-establish the 911 call; and/or the like.

In the various aspects described herein, enhanced 911 call functionalities may be provided. This allows registered third parties to be notified in the event a caller attempts to call 911; allows administrators to update user profiles associated with the caller and/or the originating TN to add, delete, or otherwise change registered third parties and their contact information; allows registered third parties to receive updates via messages (e.g., SMS, MMS, e-mail, text messages, etc.); allows registered third parties to bridge in on the 911 call (in some cases, in a listen-in only mode or in a full conference bridge mode); allows medical professionals and emergency responders to receive messages regarding the emergency necessitating the 911 call; allows medical professionals and emergency responders to bridge in on the 911 call (in some cases, in a listen-in only mode or in a full conference bridge mode) or to join a shared communication among the dispatcher and/or the other medical professionals and emergency responders; and/or the like. The enhanced 911 call functionalities may also perform tasks to alert 911 service providers, re-establish a failed 911 call, or re-route a 911 call in the event of 911 call failure.

These and other aspects of the enhanced 911 call functionalities are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, 911 communication technology, PSAP technology, 911 dispatcher technology, and/or the like. In other aspects, certain embodiments, can improve the functioning of user equipment or systems themselves (e.g., 911 communication systems, PSAP systems, 911 dispatcher systems, etc.), for example, by, in response to receiving a 911 call request from a caller using a calling device associated with an originating telephone number ("TN"), determining, using a computing system, whether a user profile associated with at least one of the caller or the originating TN contains one or more registered third parties on a 911 call notification list; and based on a determination that the user profile contains at least one registered third party on the 911 call notification list associated with the at least one of the caller or the originating TN, sending, using the computing system, a first message to each of the at least one registered third party indicating that the caller has called 911; and/or the like.

In particular, to the extent any abstract concepts are present in the various embodiments, those concepts can be implemented as described herein by devices, software, systems, and methods that involve specific novel functionality (e.g., steps or operations), such as, involving registered third parties on 911 calls initiated by the caller (e.g., by sending messages, establishing bridged communications, etc.), performing tasks in response to failed 911 call attempts (e.g., alerting 911 service providers, attempting to re-establish the 911 call, and/or re-routing the 911 call, etc.), and/or the like, to name a few examples, that extend beyond mere conventional computer processing operations. These functionalities can produce tangible results outside of the implementing computer system, including, merely by way of example, enhanced 911 call functionalities (including, but not limited to, allowing registered third parties to be notified in the event the caller attempts to call 911; allowing administrators to update user profiles associated with the caller and/or the originating TN to add, delete, or otherwise change registered third parties and their contact information; allowing registered third parties to receive updates via messages (e.g., SMS, MMS, e-mail, text messages, etc.); allowing registered third parties to bridge in on the 911 call (in some cases, in a listen-in only mode or in a full conference bridge mode); allowing medical professionals and emergency responders to receive messages regarding the emergency necessitating the 911 call; allowing medical professionals and emergency responders to bridge in on the 911 call (in some cases, in a listen-in only mode or in a full conference bridge mode) or to join a shared communication among the dispatcher and/or the other medical professionals and emergency responders; performing tasks to alert 911 service providers, re-establish a failed 911 call, or re-route a 911 call in the event of 911 call failure; or the like), and/or the like, at least some of which may be observed or measured by customers, 911 service providers, and/or PSAP or 911 dispatcher personnel.

In an aspect, a method may comprise, in response to receiving a 911 call request from a caller using a calling device associated with an originating telephone number ("TN"), determining, using a computing system, whether a user profile associated with at least one of the caller or the originating TN contains one or more registered third parties on a 911 call notification list; and based on a determination that the user profile contains at least one registered third party on the 911 call notification list associated with the at least one of the caller or the originating TN, sending, using the computing system, a first message to each of the at least one registered third party indicating that the caller has called 911.

In some embodiments, the computing system may comprise at least one of a call server, a call controller, a call manager, a public safety answering point ("PSAP") computing system, a network service provider computing system, a server computer over a network, a cloud-based computing system, or a distributed computing system, and/or the like.

According to some embodiments, the user profile associated with the at least one of the caller or the originating TN may be accessible and updateable by one or more administrators associated with the originating TN. In some instances, the caller may be an individual. In such cases, the one or more administrators may each comprise at least one of a guardian of the caller, an adult child of the caller, a parent of the caller, a grandparent of the caller, a sibling of the caller, or another relative of the caller, and/or the like. Also in such cases, the one or more registered third parties on the 911 call notification list associated with the at least one of the caller or the originating TN may each comprise at least one of the one or more administrators, an agent of the caller, a guardian of the caller, an adult child of the caller, a parent of the caller, a grandparent of the caller, a sibling of the caller, another relative of the caller, a friend of the caller, a neighbor of the caller, a doctor of the caller, a pharmacist of the caller, or a language translation service, and/or the like.

Alternatively, the caller may be one of an employee, a contractor, an owner, or a guest or visitor, and/or the like, of an entity associated with the originating TN. In such cases, the one or more administrators may each comprise at least one of security personnel, a head of security, an executive assistant, a manager, an executive officer, a board member, or an owner of the entity, and/or the like. Also in such cases, the one or more registered third parties on the 911 call notification list may each comprise at least one of the one or more administrators, an agent of the entity, security personnel of the entity, a head of security of the entity, an executive assistant of the entity, a manager of the entity, an executive officer of the entity, a board member of the entity, an owner of the entity, an attorney at a law firm representing the entity, an in-house attorney for the entity, one or more other employees of the entity working at a location associated with the 911 call request, one or more other employees of the entity working at a different location, or one or more other situation responders of the entity, and/or the like.

In some embodiments, the method may further comprise providing the one or more administrators with access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may comprise at least one of access during the 911 call that is established in response to the 911 call request or access after the 911 call that had been established in response to the 911 call request has ended. Alternatively, or additionally, the access may comprise at least one of access via a web portal, access via a software application ("app"), or access via an interactive voice response ("IVR") system, and/or the like.

According to some embodiments, sending the first message to each of the at least one registered third party indicating that the caller has called 911 may comprise sending at least one of an e-mail message, a short message service ("SMS") message, a multimedia messaging service ("MMS") message, or a text message to each of the at least one registered third party indicating that the caller has called 911, and/or the like.

In some embodiments, the method may further comprise analyzing, using the computing system, a 911 call that is established in response to the 911 call request, using speech recognition functionalities, to identify one or more keywords indicative of information regarding an emergency encountered by the caller; and performing, using the computing system, at least one of: transcribing the identified one or more keywords and sending the transcribed keywords in a short message service ("SMS") message to each of the at least one registered third party; recording the 911 call and sending a copy of the recording as an attachment in an e-mail message to each of the at least one registered third party; recording the 911 call and sending a link to access the recording in at least one of an e-mail message, a SMS message, a multimedia messaging service ("MMS") message, or a text message to each of the at least one registered third party; transcribing a recording of the 911 call and a copy of the transcript of the recording as an attachment in an e-mail message to each of the at least one registered third party; recording the 911 call and sending a link to access the transcript of the recording in at least one of an e-mail message, a SMS message, a MMS message, or a text message to each of the at least one registered third party; determining based on the identified one or more keywords that the emergency comprises a medical emergency; determining based on the identified one or more keywords that the emergency comprises a security emergency; or determining based on the identified one or more keywords that the emergency comprises an emergency having legal ramifications; and/or the like.

In some cases, the method may comprise, based on a determination that the emergency comprises a medical emergency, sending, to a medical professional, at least one of: a notification message indicating the medical emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

In some cases, the method may comprise, based on a determination that the emergency comprises a security emergency, sending, to security personnel, at least one of: a notification message indicating the security emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

In some cases, the method may comprise, based on a determination that the emergency comprises an emergency having legal ramifications, sending, to an attorney, at least one of: a notification message indicating the emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

According to some embodiments, the method may further comprise at least one of: establishing, using the computing system, a listen-in only bridged audio connection to a 911 call that is established in response to the 911 call request for each of the at least one registered third party; establishing, using the computing system, a full conference bridge to the 911 call that is established in response to the 911 call request for each of the at least one registered third party; sending, using the computing system, a second message containing at least one of a copy of a recording of the 911 call that is established in response to the 911 call request or a link to the copy of the recording of the 911 call; or sending, using the computing system, a group message to a plurality of registered third parties among the one or more registered third parties on the 911 call notification list; and/or the like.

In some embodiments, the method may further comprise establishing, using the computing system, a shared communication among the caller, a public safety answering point ("PSAP") dispatcher, and one or more emergency responders, wherein the one or more emergency responders may comprise at least one of one or more police officers, one or more firefighters, one or more emergency medical technicians ("EMTs"), one or more paramedics, or one or more language translators, and/or the like. In some cases, the shared communication may comprise at least one of: a full conference bridge; a group e-mail message; a group short message service ("SMS") message; a group multimedia messaging service ("MMS") message; or a group text message; and/or the like. In some instances, the group e-mail message, the group SMS message, the group MMS message, or the group text message may each comprise at least one of information regarding the caller, information regarding medical status of the caller, information regarding medication needs of the caller, information regarding one or more other individuals at a geographical location associated with at least one of the caller or the originating TN, information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

According to some embodiments, the method may further comprise, based on a determination that a 911 call fails to be established in response to the 911 call request, performing at least one of: alerting a 911 service provider indicating a failed 911 call; attempting to re-establish the 911 call; or re-routing call connections to re-establish the 911 call; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: in response to receiving a 911 call request from a caller using a calling device associated with an originating telephone number ("TN"), determine whether a user profile associated with at least one of the caller or the originating TN contains one or more registered third parties on a 911 call notification list; and based on a determination that the user profile contains at least one registered third party on the 911 call notification list associated with the at least one of the caller or the originating TN, send a first message to each of the at least one registered third party indicating that the caller has called 911.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: in response to receiving a 911 call request from a caller using a calling device associated with an originating telephone number ("TN"), determine whether a user profile associated with at least one of the caller or the originating TN contains one or more registered third parties on a 911 call notification list; and based on a determination that the user profile contains at least one registered third party on the 911 call notification list associated with the at least one of the caller or the originating TN, send a first message to each of the at least one registered third party indicating that the caller has called 911.

In some embodiments, the computing system may comprise at least one of a call server, a call controller, a call manager, a public safety answering point ("PSAP") computing system, a network service provider computing system, a server computer over a network, a cloud-based computing system, or a distributed computing system, and/or the like.

According to some embodiments, sending the first message to each of the at least one registered third party indicating that the caller has called 911 may comprise sending at least one of an e-mail message, a short message service ("SMS") message, a multimedia messaging service ("MMS") message, or a text message, and/or the like, to each of the at least one registered third party indicating that the caller has called 911.

In some embodiments, the first set of instructions, when executed by the at least one first processor, may further cause the computing system to perform at least one of: establish a listen-in only bridged audio connection to a 911 call that is established in response to the 911 call request for each of the at least one registered third party; establish a full conference bridge to the 911 call that is established in response to the 911 call request for each of the at least one registered third party; send a second message containing at least one of a copy of a recording of the 911 call that is established in response to the 911 call request or a link to the copy of the recording of the 911 call; or send a group message to a plurality of registered third parties among the one or more registered third parties on the 911 call notification list; and/or the like.

According to some embodiments, the first set of instructions, when executed by the at least one first processor, may further cause the computing system to: establish a shared communication among the caller, a public safety answering point ("PSAP") dispatcher, and one or more emergency responders, wherein the one or more emergency responders may comprise at least one of one or more police officers, one or more firefighters, one or more emergency medical technicians ("EMTs"), one or more paramedics, or one or more language translators.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing 911 call functionalities, and, more particularly, to methods, systems, and apparatuses for implementing enhanced 911 call functionalities, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing enhanced 911 call functionalities, in accordance with various embodiments.

In the non-limiting embodiment of FIG. 1, system 100 may comprise a calling device 105 associated with an originating telephone number ("TN") 110 that is associated with an originating party 115 and/or associated with an entity with which the originating party 120 is associated, and that is associated with a caller location 120. In some instances, the calling device 105 (also referred to as "user device 105" or the like) may include, but is not limited to, at least one of a telephone 105a, a smart phone 105b, or a mobile phone 105c, and/or the like. In some cases, the caller location 120 may include, without limitation, one of a single family house, a multi-dwelling unit ("MDU") within a multi-dwelling complex (including, but not limited to, an apartment building, an apartment complex, a condominium complex, a townhouse complex, a mixed-use building, etc.), an office building or complex, a commercial building or complex, an industrial building or complex, and/or the like. System 100 may further comprise a computing system 130 and corresponding database(s) 135, the computing system 130 performing functions and features of the various embodiments for enhancing 911 calls between calling devices (e.g., calling device 105 associated with originating TN 110, or the like) and a public safety answering point ("PSAP") 140 via one or more networks 125.

In some embodiments, the computing system 130 may include, but is not limited to, at least one of a call server, a call controller, a call manager, a PSAP computing system, a network service provider computing system, a server computer over a network, a cloud-based computing system, or a distributed computing system, and/or the like. According to some embodiments, the PSAP 140 may include, without limitation, a PSAP gateway 140*a*, a PSAP computing system 140*b* and corresponding database(s) 140*c*, and a 911 dispatcher system 145 (comprising a voice communications system 145*a*, which may include, but is not limited to, a telephone system, a voice over Internet Protocol ("VoIP") phone system, or other voice communications system, and/or the like). In some cases, the 911 dispatcher system 145 may be integrated with the PSAP 140. Alternatively, the 911 dispatcher system 145 may be separate yet communicatively coupled with PSAP 140. Alternatively, the 911 dispatcher system 145 may include some portions of voice communications system 145*a* that are integrated with PSAP 140 and other portions of voice communications system (not shown) that are separate yet communicatively coupled with PSAP 140.

In some embodiments, network(s) 125 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 125 may include an access network of the service provider (e.g., an Internet service provider ("ISP")). In another embodiment, the network(s) 125 may include a core network of the service provider and/or the Internet.

System 100 may further comprise one or more user devices 150 associated with one or more emergency responders 155, one or more user devices 160 associated with one or more administrators 165, one or more user devices 170*a*-170*n* associated with one or more third parties 175*a*-175*n*, one or more user devices 180 associated with one or more medical professionals 185, and a service provider system 190 and corresponding database(s) 195. User devices 150, 160, 170*a*-170*n*, and 180 may each include, without limitation, at least one of a telephone, a smart phone, a mobile phone, a tablet computer, a laptop computer, a desktop computer, and/or the like. In some instances, the one or more emergency responders 155 may include, but are not limited to, at least one of one or more police officers, one or more firefighters, one or more emergency medical technicians ("EMTs"), one or more paramedics, or one or more language translators, and/or the like. In some cases, the service provider system 190 (and corresponding database(s) 195) may perform tasks for establishing, monitoring, maintaining, and/or repairing network operations for establishing call connections among parties, including 911 call connections, or the like.

In the case that the originating party or caller 115 is an individual who is associated with the originating TN 110, rather than an employee, a contractor, an owner, or a guest or visitor of an entity associated with the originating TN 110, the one or more administrators 165 may each include, but is not limited to, at least one of a guardian of the caller, an adult child of the caller, a parent of the caller, a grandparent of the caller, a sibling of the caller, or another relative of the caller, and/or the like. Also in such cases, the one or more registered third parties 175*a*-175*n*, who may be placed on a 911 call notification list associated with the at least one of the originating party 115 and/or the originating TN 110, may each include, without limitation, at least one of the one or more administrators 165, an agent of the caller, a guardian of the caller, an adult child of the caller, a parent of the caller, a grandparent of the caller, a sibling of the caller, another relative of the caller, a friend of the caller, a neighbor of the caller, a doctor of the caller, a pharmacist of the caller, or a language translation service, and/or the like.

Alternatively, in the case that the originating party or caller 115 is an employee, a contractor, an owner, or a guest or visitor of an entity associated with the originating TN 110, the one or more administrators 165 may each include, but is not limited to, at least one of security personnel, a head of security, an executive assistant, a manager, an executive officer, a board member, or an owner of the entity, and/or the like. Also in such cases, the one or more registered third parties 175*a*-175*n*, who may be placed on a 911 call notification list associated with the at least one of the originating party 115 and/or the originating TN 110, may each include, without limitation, at least one of the one or more administrators 165, an agent of the entity, security personnel of the entity, a head of security of the entity, an executive assistant of the entity, a manager of the entity, an executive officer of the entity, a board member of the entity, an owner of the entity, an attorney at a law firm representing the entity, an in-house attorney for the entity, one or more other employees of the entity working at a location associated with the 911 call request (e.g., caller location 120, or the like), one or more other employees of the entity working at a different location (not shown), or one or more other situation responders of the entity (e.g., security personnel who are employed or contracted by the entity and trained to serve similar roles as emergency responders, or personnel who are employed or contracted by the entity and trained to serve similar roles as emergency management agency personnel, or the like), and/or the like.

In operation, computing system 130 and/or PSAP computing system 140*b* (collectively, "computing system" or the like) may receive a 911 call request from a caller (e.g., originating party 115, or the like) using a calling device (e.g., calling device 105, or the like) associated with an originating TN (e.g., originating TN 110, or the like). In response to receiving the 911 call request from the caller using the calling device associated with the originating TN, the computing system may determine whether a user profile associated with at least one of the caller or the originating TN contains one or more registered third parties on a 911 call notification list. In some cases, the user profile may be stored on a database(s) (e.g., database(s) 135 or 140*c*, or the like).

Based on a determination that the user profile contains at least one registered third party (e.g., registered third parties 175a-175n, or the like) on the 911 call notification list associated with the at least one of the caller or the originating TN, the computing system may send a first message to each of the at least one registered third party indicating that the caller has called 911. According to some embodiments, the user profile associated with the at least one of the caller or the originating TN may be accessible and updateable by one or more administrators associated with the originating TN.

In some embodiments, the computing system may provide the one or more administrators (e.g., administrator(s) 165, or the like) with access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may include, without limitation, at least one of access during the 911 call that is established in response to the 911 call request or access after the 911 call that had been established in response to the 911 call request has ended. Alternatively, or additionally, the access may include, but is not limited to, at least one of access via a web portal, access via a software application ("app"), or access via an interactive voice response ("IVR") system, and/or the like.

According to some embodiments, sending the first message to each of the at least one registered third party indicating that the caller has called 911 may comprise sending at least one of an e-mail message, a short message service ("SMS") message, a multimedia messaging service ("MMS") message, or a text message to each of the at least one registered third party indicating that the caller has called 911, and/or the like.

In some embodiments, the computing system may analyze a 911 call that is established in response to the 911 call request, using speech recognition functionalities, to identify one or more keywords indicative of information regarding an emergency encountered by the caller; and may perform at least one of: transcribing the identified one or more keywords and sending the transcribed keywords in a SMS message to each of the at least one registered third party; recording the 911 call and sending a copy of the recording as an attachment in an e-mail message to each of the at least one registered third party; recording the 911 call and sending a link to access the recording in at least one of an e-mail message, a SMS message, a MMS message, or a text message to each of the at least one registered third party; transcribing a recording of the 911 call and a copy of the transcript of the recording as an attachment in an e-mail message to each of the at least one registered third party; recording the 911 call and sending a link to access the transcript of the recording in at least one of an e-mail message, a SMS message, a MMS message, or a text message to each of the at least one registered third party; determining based on the identified one or more keywords that the emergency comprises a medical emergency; determining based on the identified one or more keywords that the emergency comprises a security emergency; or determining based on the identified one or more keywords that the emergency comprises an emergency having legal ramifications; and/or the like.

In some cases, based on a determination that the emergency comprises a medical emergency, the computing system may send, to a medical professional (e.g., medical professional(s) 185, or the like), at least one of: a notification message indicating the medical emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

Alternatively, or additionally, based on a determination that the emergency comprises a security emergency, the computing system may send, to security personnel, at least one of: a notification message indicating the security emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

Alternatively, or additionally, based on a determination that the emergency comprises an emergency having legal ramifications, the computing system may send, to an attorney, at least one of: a notification message indicating the emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

According to some embodiments, the computing system may perform at least one of: establishing a listen-in only bridged audio connection to a 911 call that is established in response to the 911 call request for each of the at least one registered third party; establishing a full conference bridge to the 911 call that is established in response to the 911 call request for each of the at least one registered third party; sending a second message containing at least one of a copy of a recording of the 911 call that is established in response to the 911 call request or a link to the copy of the recording of the 911 call; or sending a group message to a plurality of registered third parties among the one or more registered third parties on the 911 call notification list; and/or the like.

In some embodiments, the computing system may establish a shared communication among the caller (e.g., originating party 115, or the like), a PSAP dispatcher (responding to the 911 call or 911 call request from caller 115 using 911 dispatcher system 145 and/or voice communications system 145a, or the like), and one or more emergency responders (e.g., emergency responder(s) 155, or the like). In some cases, the shared communication may include, but is not limited to, at least one of: a full conference bridge; a group e-mail message; a group SMS message; a group MMS message; or a group text message; and/or the like. In some instances, the group e-mail message, the group SMS message, the group MMS message, or the group text message may each include, without limitation, at least one of information regarding the caller, information regarding medical status of the caller, information regarding medication needs of the caller, information regarding one or more other individuals at a geographical location associated with at least one of the caller or the originating TN (e.g., caller location 120, or the like), information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

According to some embodiments, based on a determination that a 911 call fails to be established in response to the 911 call request, the computing system may perform at least one of: alerting a 911 service provider (e.g., service provider system 190, or the like) indicating a failed 911 call; attempting to re-establish the 911 call; or re-routing call connections to re-establish the 911 call; and/or the like.

These and other functions of the system 100 (and its components) are described in greater detail below with respect to FIGS. 2-4.

Figure 2A:
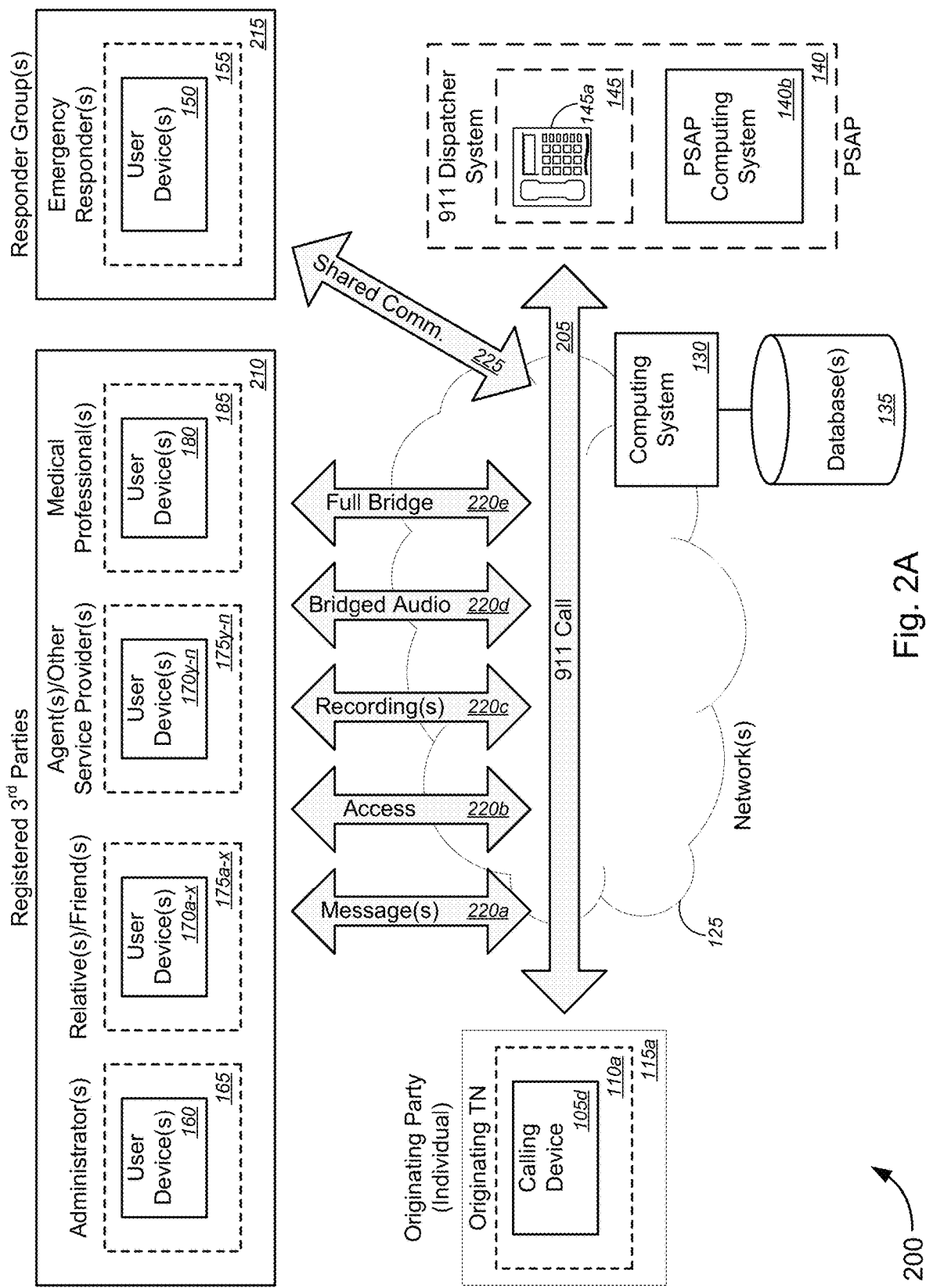
FIGS. 2A and 2B are schematic diagrams illustrating various non-limiting examples of involving other parties on a 911 call during implementation of enhanced 911 call functionalities, in accordance with various embodiments.
Figure 2B:
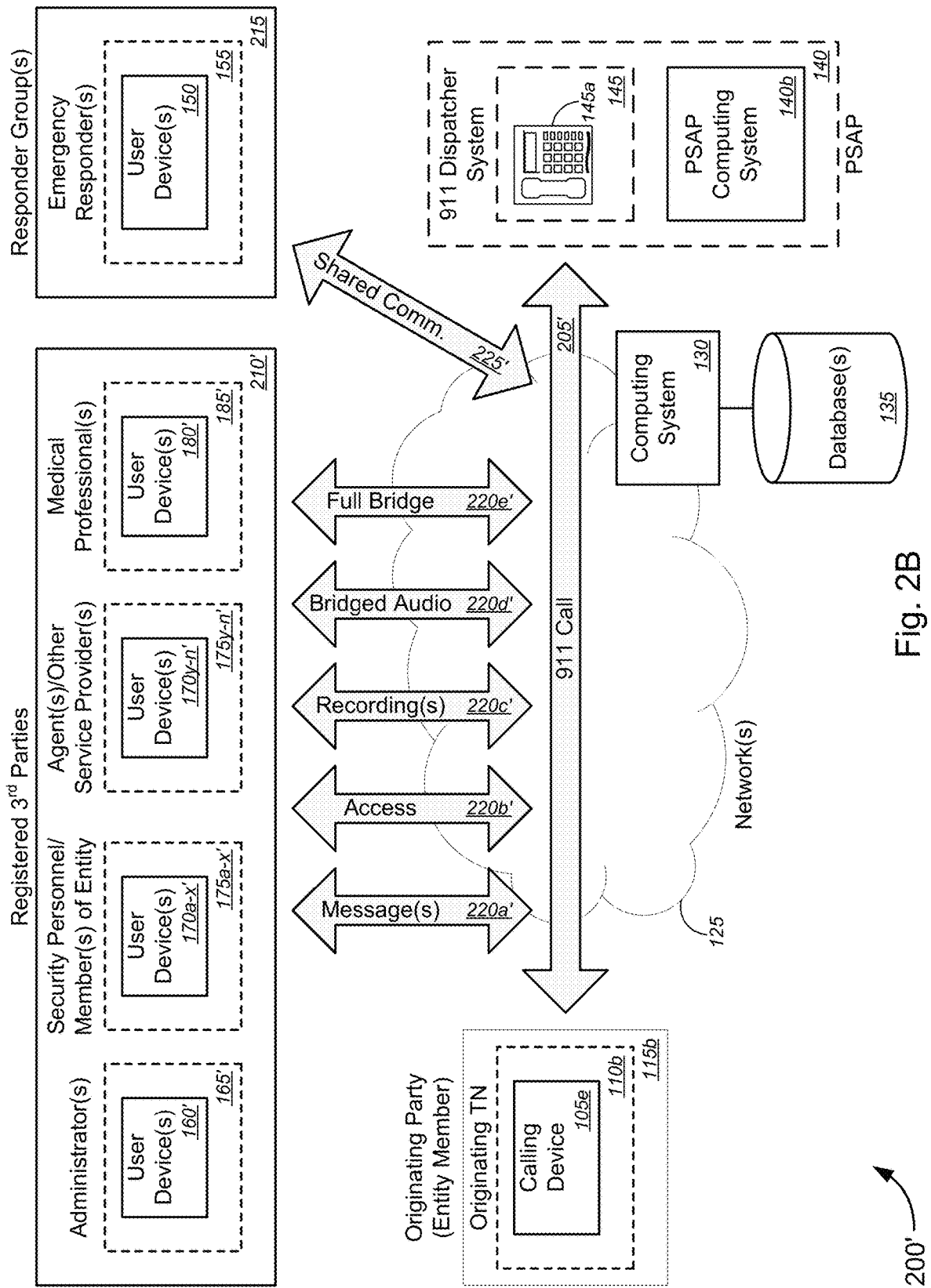

FIGS. 2A and 2B (collectively, "FIG. 2") are schematic diagrams illustrating various non-limiting examples 200 and 200' of involving other parties on a 911 call during implementation of enhanced 911 call functionalities, in accordance with various embodiments.

With reference to the non-limiting example 200 of FIG. 2A, originating party or caller 115a may be an individual who is associated with originating TN 110a. When originating party or caller 115a dials 911 on calling device 105d, which is associated with originating TN 110a, a 911 call request may be sent through the network(s) 125, and, in some cases, a 911 call 205 may be established between calling device 105d and PSAP 140. In some instances, PSAP 140 may include, but is not limited to, PSAP computing system 140b and 911 dispatcher system 145 (which may include voice communications system 145a, or the like). In some cases, PSAP 140 may also include, without limitation, PSAP gateway 140a and database(s) 140c, such as shown in FIG. 1, or the like. Computing system 130 (and corresponding database(s) 135) may provide enhanced 911 call functionalities, including, but not limited to, involving registered third parties 210 and/or involving responder group(s) 215 on the 911 call 205.

The registered third parties 210 may include one or more administrators 165 (with corresponding user device(s) 160), one or more relatives and/or friends 175a-175x (with corresponding user device(s) 170a-170x), one or more agents and/or other service providers 175y-175n (with corresponding user device(s) 170y-170n), and one or more medical professionals 185 (with corresponding user device(s) 180), or the like. In some instances, the one or more administrators 165 may each include, but is not limited to, at least one of a guardian of the caller, an adult child of the caller, a parent of the caller, a grandparent of the caller, a sibling of the caller, or another relative of the caller, and/or the like. In some cases, the one or more relatives and/or friends 175a-175x, who may be placed on a 911 call notification list associated with the at least one of the originating party 115a and/or the originating TN 110a (by at least one administrator 165), may each include, without limitation, at least one of a guardian of the caller, an adult child of the caller, a parent of the caller, a grandparent of the caller, a sibling of the caller, another relative of the caller, a friend of the caller, or a neighbor of the caller, and/or the like. In some instances, the one or more agents and/or other service providers 175y-175n, who may also be placed on a 911 call notification list associated with the at least one of the originating party 115a and/or the originating TN 110a (by at least one administrator 165), may each include, without limitation, at least one of an agent of the caller, an attorney of the caller, or a language translation service (which may be engaged by the originating party 115a and/or by at least one administrator 165 to perform language translation, or the like), and/or the like. In some cases, the one or more medical professionals 185, who may also be placed on a 911 call notification list associated with the at least one of the originating party 115a and/or the originating TN 110a (by at least one administrator 165), may each include, without limitation, at least one of a doctor of the caller or a pharmacist of the caller, and/or the like.

The responder group(s) 215 may include one or more emergency responders 155 (with corresponding user device(s) 150), or the like. In some instances, the one or more emergency responders 155 may include, but are not limited to, at least one of one or more police officers, one or more firefighters, one or more emergency medical technicians ("EMTs"), one or more paramedics, or one or more language translators (who may be affiliated with or may work with governmental agencies including law enforcement agencies, fire departments, or hospitals, etc.), and/or the like.

In some embodiments, involving the registered third parties 210 on the 911 call 205 may include computing system 130 performing at least one of: (a) sending one or more messages 220a regarding the 911 call request and/or the 911 call 205 to at least one registered third party 210; (b) providing access 220b to 911 call request records and/or 911 call records associated with the originating party 115a and/or associated with the originating TN 110a to at least some of the registered third parties 210 (e.g., administrator(s) 165 and/or medical professional(s) 185, or the like); (c) sending recordings 220c of the current or latest 911 call (and in some cases, of past 911 calls) to at least some of the registered third parties 210; (d) establishing a listen-in only bridged audio connection 220d between each of at least one registered third party 210 and the current 911 call (e.g., 911 call 205); or (e) establishing a full conference bridge 220e between each of at least one registered third party 210 and the current 911 call; and/or the like.

In some cases, the one or more messages 220a may include, without limitation, at least one of a message indicating that the originating party 115a has sent a 911 call request using calling device 105d associated with originating TN 110a (i.e., that the originating party 115a has attempted to dial 911, etc.), a message indicating that a 911 call 205 is in progress between the originating party 115a and a 911 dispatcher at PSAP 140, a message providing information regarding the situation, circumstances, and/or emergency for the 911 call attempt or 911 call 205, a message providing options to continue receiving updated messages, a message providing options for access 220b to additional information regarding the 911 call 205, a message providing options for providing information about the originating party 115a to emergency responders (e.g., information regarding health status and/or potential health concerns of the originating party 115*a*, information regarding location of medications for health conditions of the originating party 115*a*, information regarding physical access issues at a caller location from which the originating party 115*a* dialed 911, etc.), a message providing options to receive one or more recordings 220*c* of the 911 call 205 (and/or to past 911 calls associated with the originating party 115*a* and/or originating TN 110*a*, or the like), a message providing options to join a listen-in only bridged audio connection 220*d* to the 911 call 205, a message providing options to join a full bridge connection 220*e* to the 911 call 205, or a group message to a plurality of registered third parties 210 (the group message being one or more of the above-described messages), and/or the like. In some instances, prior to providing options to join a bridged connection (whether listen-in only or full bridge), computing system 130 may determine whether the local PSAP 140 has support for either or both types of bridge. If not, then the option may be removed from the list to options provided to the registered third parties 210. In some embodiments, the one or more messages 220*a* may each be in the form of at least one of an e-mail message, a SMS message, a MMS message, or a text message, and/or the like. In some cases, prior to sending the one or more messages 220*a*, computing system 130 may determine whether the local PSAP 140 has support for which type of messages, and, based on such determination, may send the one or more messages 220*a* in the appropriate form based also in part on contact information provided for each registered third party (e.g., some registered third parties may be missing e-mail addresses or SMS capable TNs, etc. in the user profile for the caller, or the like).

In some instances, providing access 220*b* may include, but is not limited to, providing access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may include, without limitation, at least one of access during the 911 call that is established in response to the 911 call request or access after the 911 call that had been established in response to the 911 call request has ended. Alternatively, or additionally, the access may include, but is not limited to, at least one of access via a web portal, access via a software application ("app"), or access via an interactive voice response ("IVR") system, and/or the like.

In some cases, sending the recordings 220*c* may include, without limitation, at least one of sending a message containing a copy of a recording of the current 911 call, sending a message containing a link to the copy of the recording of the current 911 call, sending a message containing a copy of a recording of one or more past 911 calls, sending a message containing a link to the copy of the recording of the one or more past 911 calls, and/or the like.

Alternatively, or additionally, involving responder group(s) 215 on the 911 call 205 may include computing system 130 establishing a shared communication 225 among the caller (e.g., originating party 115*a*, or the like), a PSAP dispatcher (responding to the 911 call or 911 call request from caller 115*a* using 911 dispatcher system 145 and/or voice communications system 145*a*, or the like), and one or more emergency responders (e.g., emergency responder(s) 155, or the like). In some cases, the shared communication 225 may include, but is not limited to, at least one of: a full conference bridge; a group e-mail message; a group SMS message; a group MMS message; or a group text message; and/or the like. In some instances, the group e-mail message, the group SMS message, the group MMS message, or the group text message may each include, without limitation, at least one of information regarding the caller, information regarding medical status of the caller, information regarding medication needs of the caller, information regarding one or more other individuals at a geographical location associated with at least one of the caller or the originating TN (e.g., caller location 120, or the like), information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

In a non-limiting example, a grandmother calls 911, and her daughter (who is her medical guardian) may be automatically notified, in some cases, via SMS alert even if the 911 call fails, as part of the enhanced 911 call functionalities. The enhanced 911 call functionalities also allow her daughter to bridge in (either in a listen-only mode or in a full conference bridge mode), to listen to a recording of the 911 call after the fact, to access a history of 911 calls from her mother, to update the list of registered third parties for receiving 911 call notifications associated with her mother, to provide information (e.g., where her mother's medications may be found, what medical conditions her mother may be suffering from, etc.), and/or the like. The enhanced 911 call functionalities may also enable medical professionals to receive notifications or messages regarding the 911 call (or 911 call attempt), to receive options for bridging in (either in a listen-only mode or in a full conference bridge mode), to provide information (e.g., what medical conditions the caller may be suffering from, and what medications have been prescribed, etc.), and/or the like. The enhanced 911 call functionalities may also enable emergency responders to receive notifications or messages regarding the 911 call (or 911 call attempt), to receive options for bridging in (either in a listen-only mode or in a full conference bridge mode), to receive information regarding location, the caller, and medical conditions of the caller, and/or the like.

Referring to the non-limiting example 200' of FIG. 2B, originating party or caller 115*b* may be a member (e.g., an employee, a contractor, an owner, or a guest or visitor, etc.) of an entity that is associated with originating TN 110*b*. When originating party or caller 115*b* dials 911 on calling device 105*e*, which is associated with originating TN 110*b*, a 911 call request may be sent through the network(s) 125, and, in some cases, a 911 call 205' may be established between calling device 105*e* and PSAP 140. Network(s) 125, computing system 130 (and corresponding database(s) 135), PSAP 140, and responder group(s) 215 (and emergency responder(s) 155 with user device(s) 150) in FIG. 2B may otherwise be similar, if not identical, to the network(s) 125, computing system 130 (and corresponding database(s)

135), PSAP 140, and responder group(s) 215 (and emergency responder(s) 155 with user device(s) 150), respectively, in FIG. 2A.

The registered third parties 210' may include one or more administrators 165' (with corresponding user device(s) 160'), one or more security personnel and/or members of the entity 175a'-175x' (with corresponding user device(s) 170a'-170x'), one or more agents and/or other service providers 175y'-175n' (with corresponding user device(s) 170y'-170n'), and one or more medical professionals 185' (with corresponding user device(s) 180'), or the like. In some instances, the one or more administrators 165' may each include, but is not limited to, at least one of security personnel, a head of security, an executive assistant, a manager, an executive officer, a board member, or an owner of the entity, and/or the like. In some cases, the one or more security personnel and/or members of the entity 175a'-175x', who may be placed on a 911 call notification list associated with the at least one of the originating party 115b and/or the originating TN 110b (by at least one administrator 165'), may each include, without limitation, at least one of security personnel of the entity, a head of security of the entity, an executive assistant of the entity, a manager of the entity, an executive officer of the entity, a board member of the entity, an owner of the entity, an in-house attorney for the entity, one or more other employees of the entity working at a location associated with the 911 call request, one or more other employees of the entity working at a different location (not shown), or one or more other situation responders of the entity (e.g., security personnel who are employed or contracted by the entity and trained to serve similar roles as emergency responders, or personnel who are employed or contracted by the entity and trained to serve similar roles as emergency management agency personnel, or the like), and/or the like. In some instances, the one or more agents and/or other service providers 175y'-175n', who may also be placed on a 911 call notification list associated with the at least one of the originating party 115b and/or the originating TN 110b (by at least one administrator 165'), may each include, without limitation, at least one of an agent of the entity, an attorney at a law firm representing the entity, and/or the like. In some cases, the one or more medical professionals 185', who may also be placed on a 911 call notification list associated with the at least one of the originating party 115b and/or the originating TN 110b (by at least one administrator 165'), may each include, without limitation, at least one of a doctor, a nurse, or a pharmacist, and/or the like.

In some embodiments, involving the registered third parties 210' on the 911 call 205' may include computing system 130 performing at least one of: (a) sending one or more messages 220a' regarding the 911 call request and/or the 911 call 205' to at least one registered third party 210'; (b) providing access 220b' to 911 call request records and/or 911 call records associated with the originating party 115b, associated with the entity, and/or associated with the originating TN 110b to at least some of the registered third parties 210' (e.g., administrator(s) 165' and/or medical professional(s) 185', or the like); (c) sending recordings 220c' of the current or latest 911 call (and in some cases, of past 911 calls) to at least some of the registered third parties 210'; (d) establishing a listen-in only bridged audio connection 220d' between each of at least one registered third party 210' and the current 911 call (e.g., 911 call 205'); or (e) establishing a full conference bridge 220e' between each of at least one registered third party 210' and the current 911 call; and/or the like.

In some cases, the one or more messages 220a' may include, without limitation, at least one of a message indicating that the originating party 115b has sent a 911 call request using calling device 105e associated with originating TN 110b (i.e., that the originating party 115b has attempted to dial 911, etc.), a message indicating that a 911 call 205' is in progress between the originating party 115b and a 911 dispatcher at PSAP 140, a message providing information regarding the situation, circumstances, and/or emergency for the 911 call attempt or 911 call 205', a message providing options to continue receiving updated messages, a message providing options for access 220b' to additional information regarding the 911 call 205', a message providing options for providing information about the originating party 115b and/or the entity to emergency responders (e.g., information regarding health status and/or potential health concerns of the originating party 115b, information regarding physical access issues at a caller location from which the originating party 115b dialed 911, or other information regarding the entity and structures on the premises, etc.), a message providing options to receive one or more recordings 220c' of the 911 call 205' (and/or to past 911 calls associated with the originating party 115b, the entity, and/or originating TN 110b, or the like), a message providing options to join a listen-in only bridged audio connection 220d' to the 911 call 205', a message providing options to join a full bridge connection 220e' to the 911 call 205', or a group message to a plurality of registered third parties 210' (the group message being one or more of the above-described messages), and/or the like. In some instances, prior to providing options to join a bridged connection (whether listen-in only or full bridge), computing system 130 may determine whether the local PSAP 140 has support for either or both types of bridge. If not, then the option may be removed from the list to options provided to the registered third parties 210'. In some embodiments, the one or more messages 220a', like message(s) 220, may each be in the form of at least one of an e-mail message, a SMS message, a MMS message, or a text message, and/or the like. In some cases, prior to sending the one or more messages 220a', computing system 130 may determine whether the local PSAP 140 has support for which type of messages, and, based on such determination, may send the one or more messages 220a' in the appropriate form based also in part on contact information provided for each registered third party (e.g., some registered third parties may be missing e-mail addresses or SMS capable TNs, etc. in the profile for the caller, or the like).

In some instances, providing access 220b' may include, but is not limited to, providing access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may include, without limitation, at least one of access during the 911 call that is established in response to the 911 call request or access after the 911 call that had been established in response to the 911 call request has ended. Alternatively, or additionally, the access may include, but is not limited to, at least one of access via a web portal, access via an app, or access via an IVR system, and/or the like.

In some cases, sending the recordings 220c' may include, without limitation, at least one of sending a message containing a copy of a recording of the current 911 call, sending a message containing a link to the copy of the recording of the current 911 call, sending a message containing a copy of a recording of one or more past 911 calls associated with originating TN 110b, sending a message containing a link to the copy of the recording of the one or more past 911 calls associated with originating TN 110b, and/or the like.

Alternatively, or additionally, involving responder group(s) 215 on the 911 call 205' may include computing system 130 establishing a shared communication 225' among the caller (e.g., originating party 115b, or the like), a PSAP dispatcher (responding to the 911 call or 911 call request from caller 115b using 911 dispatcher system 145 and/or voice communications system 145a, or the like), and one or more emergency responders (e.g., emergency responder(s) 155, or the like). In some cases, the shared communication 225' may include, but is not limited to, at least one of: a full conference bridge; a group e-mail message; a group SMS message; a group MMS message; or a group text message; and/or the like. In some instances, the group e-mail message, the group SMS message, the group MMS message, or the group text message may each include, without limitation, at least one of information regarding the caller, information regarding medical status of the caller, information regarding medication needs of the caller, information regarding one or more other individuals at a geographical location associated with at least one of the caller or the originating TN (e.g., caller location 120, or the like), information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

In a non-limiting example, a security guard in a large office building may be provided with the option to listen in on a 911 call made from any phone in the building, may thus be provided an opportunity to prepare for the arrival of emergency responders (e.g., emergency medical technicians ("EMTs") or paramedics, etc.), and/or may be provided an opportunity to start engaging other resources needed to reduce the company's liability and/or to show that the company made best efforts, etc. The enhanced 911 call functionalities also allow the security guard and/or other security personnel to bridge in (either in a listen-only mode or in a full conference bridge mode), to listen to a recording of the 911 call after the fact, to access a history of 911 calls from people in the building, to receive group messages regarding company policies for responding to the emergency, to provide information (e.g., updates to the emergency situation, location of people and other security personnel in the building, etc.), and/or the like. The enhanced 911 call functionalities may also enable medical professionals to receive notifications or messages regarding the 911 call (or 911 call attempt), to receive options for bridging in (either in a listen-only mode or in a full conference bridge mode), and/or the like. The enhanced 911 call functionalities may also enable emergency responders to receive notifications or messages regarding the 911 call (or 911 call attempt), to receive options for bridging in (either in a listen-only mode or in a full conference bridge mode), to receive information regarding location, people, and medical conditions of said people, and/or the like.

Calling device 105d or 105e, originating TN 110a or 110b, originating party or caller 115a or 115b, network(s) 125, computing system 130, database(s) 135, PSAP 140, PSAP computing system 140b, 911 dispatcher system 145, voice communication system 145a, user device(s) 150, emergency responder(s) 155, user device(s) 160 or 160', administrator(s) 165 or 165', user device(s) 170a-170n or 170a'-170n', relative(s)/friend(s)/security personnel/member(s) of entity/agent(s)/other service providers 175a-175n or 175a'-175n', user device(s) 180 or 180', and medical professional(s) 185 or 185' in FIG. 2A or 2B may be similar, if not identical, to the Calling device 105 or 105a-105c, originating TN 110, originating party or caller 115, network(s) 125, computing system 130, database(s) 135, PSAP 140, PSAP computing system 140b, 911 dispatcher system 145, voice communication system 145a, user device(s) 150, emergency responder(s) 155, user device(s) 160, administrator(s) 165, user device(s) 170a-170n, registered third parties 175a-175n, user device(s) 180, and medical professional(s) 185, respectively, in FIG. 1, and the description of these components in FIG. 1 may be applicable to the corresponding components in FIG. 2A or 2B.

Figure 3:
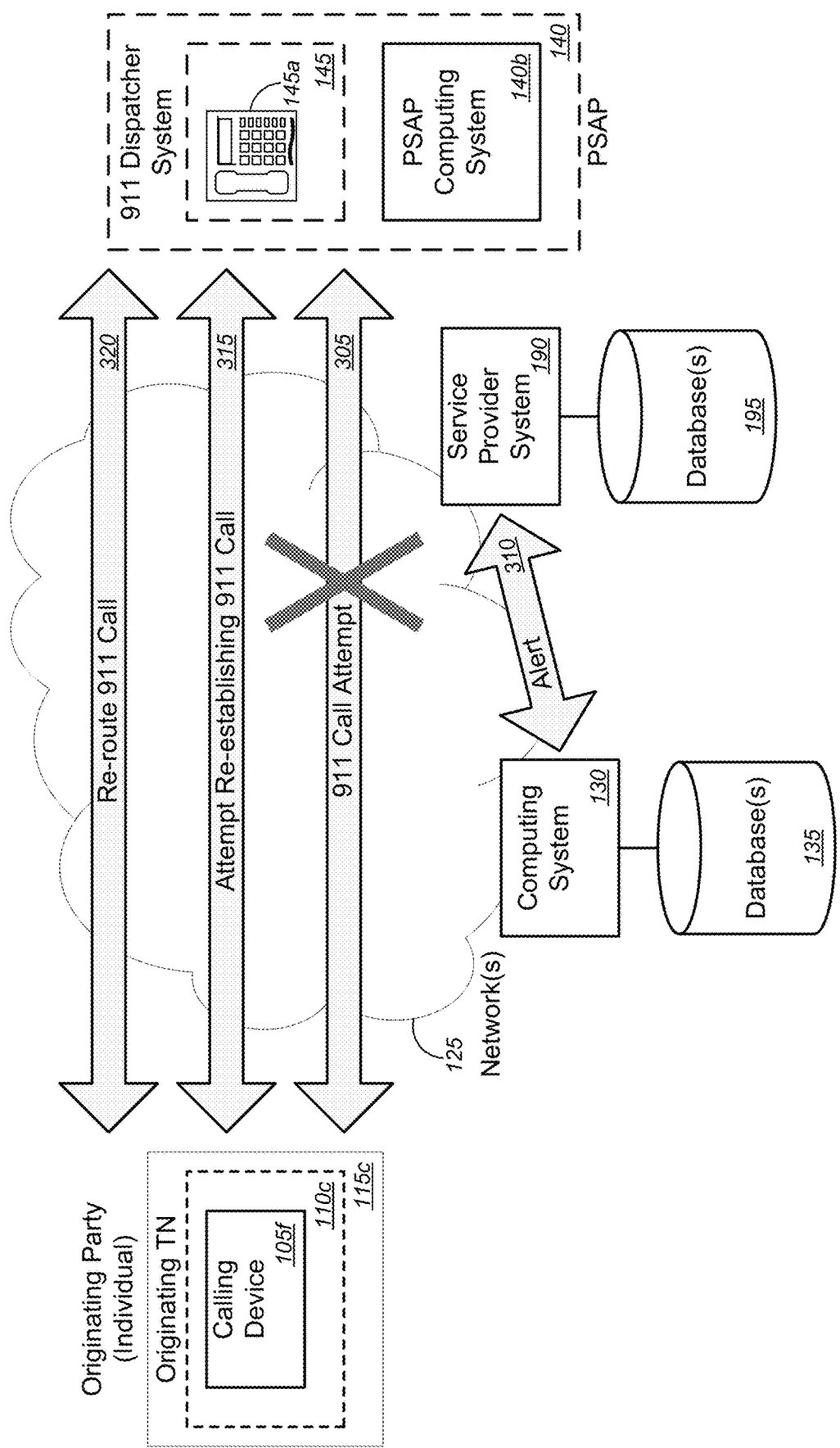
FIG. 3 is a schematic diagram illustrating a non-limiting example of processes that may be implemented in response to a failed 911 call attempt, in accordance with various embodiments.

FIG. 3 is a schematic diagram illustrating a non-limiting example 300 of processes that may be implemented in response to a failed 911 call attempt, in accordance with various embodiments.

With reference to the non-limiting example 300 of FIG. 3, when an originating party 115c (whether an individual, such as shown in FIG. 2A or 3, or a member of an entity, such as shown in FIG. 2B, or the like) attempts to request or initiate a 911 call (i.e., dials 911, or the like), a 911 call request may be sent by calling device 105f associated with originating TN 110c. In the case that the 911 call attempt 305 to the PSAP 140 fails (as depicted in FIG. 3 by the "X" across the double-headed arrow denoting 911 call attempt 305 between originating party 115c and/or calling device 105f and PSAP 140 and/or 911 dispatcher system 145, or the like), computing system 130 (with corresponding database(s) 135) may perform at least one of: alerting a 911 service provider (e.g., service provider system 190 (with corresponding database(s) 195), or the like) indicating a failed 911 call (as depicted in FIG. 3 by the double-headed arrow denoting alert 310 between computing system 130 and service provider system 190); attempting to re-establish the 911 call (as depicted in FIG. 3 by the double-headed arrow denoting attempt to re-establish the 911 call 315 between originating party 115c and/or calling device 105f and PSAP 140 and/or 911 dispatcher system 145, or the like); or re-routing call connections to re-establish the 911 call (as depicted in FIG. 3 by the double-headed arrow denoting re-routing the 911 call 320 between originating party 115c and/or calling device 105f and PSAP 140 and/or 911 dispatcher system 145, or the like); and/or the like.

In some embodiments, attempting to re-establish the 911 call 315 may include, without limitation, initiating an "INVITE" command or initiating a "RE-INVITE" command in the case the PSAP returns a busy signal (in the case of a session initiation protocol ("SIP")-based call), sending an initial address message ("IAM") or sending a resume message ("RES") (in the case of a signaling system no. 7 ("SS7")-based call), or the like. According to some embodiments, re-routing the 911 call 320 may include, but is not limited to, re-routing the 911 call through one or more other local nodes, re-routing the 911 call through one or more regional nodes, and/or re-routing the 911 call through a national PSAP, or the like. Computing system 130 may also track 911 call failures, in which the tracked 911 call failures may be used for billing appropriate call service providers or 911 call providers for the failed 911 calls or failed 911 call mis-routes, or the like.

Calling device 105f, originating TN 110c, originating party or caller 115c, network(s) 125, computing system 130, database(s) 135, PSAP 140, PSAP computing system 140b, 911 dispatcher system 145, voice communication system 145a, service provider system 190, and database(s) 195 in FIG. 3 may be similar, if not identical, to the Calling device 105 or 105a-105c, originating TN 110, originating party or caller 115, network(s) 125, computing system 130, database(s) 135, PSAP 140, PSAP computing system 140b, 911 dispatcher system 145, voice communication system 145a, service provider system 190, and database(s) 195, respectively, in FIG. 1, and the description of these components in FIG. 1 may be applicable to the corresponding components in FIG. 3.

Regardless of whether a 911 call is eventually established, in response to the 911 call attempt 305, computing system 130 may send notifications or messages to one or more registered third parties, as described above with respect to FIGS. 1, 2A, and 2B. Other features and functionalities of enhanced 911 call functionalities as described above with respect to FIGS. 1, 2A, and 2B may also be implemented, based at least in part on whether the 911 call is re-established or re-routed or whether no 911 call results, and based at least in part on options selected by registered third parties and/or emergency responders, as described in detail above.

FIGS. 4A-4F (collectively, "FIG. 4") are flow diagrams illustrating a method 400 for implementing enhanced 911 call functionalities, in accordance with various embodiments. Method 400 of FIG. 4A continues onto FIG. 4B following the circular marker denoted, "A," continues onto FIG. 4C following the circular marker denoted, "B," continues onto FIG. 4D following the circular marker denoted, "C," continues onto FIG. 4E following the circular marker denoted, "D," and/or continues onto FIG. 4F following the circular marker denoted, "E."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', and 300 of FIGS. 1, 2A, 2B, and 3, respectively (or components thereof), such methods may also be implemented using any suitable hardware (or software) implementation. Similarly, while each of the systems, examples, or embodiments 100, 200, 200', and 300 of FIGS. 1, 2A, 2B, and 3, respectively (or components thereof), can operate according to the method 400 illustrated by FIG. 4 (e.g., by executing instructions embodied on a computer readable medium), the systems, examples, or embodiments 100, 200, 200', and 300 of FIGS. 1, 2A, 2B, and 3 can each also operate according to other modes of operation and/or perform other suitable procedures.

Figure 4A:
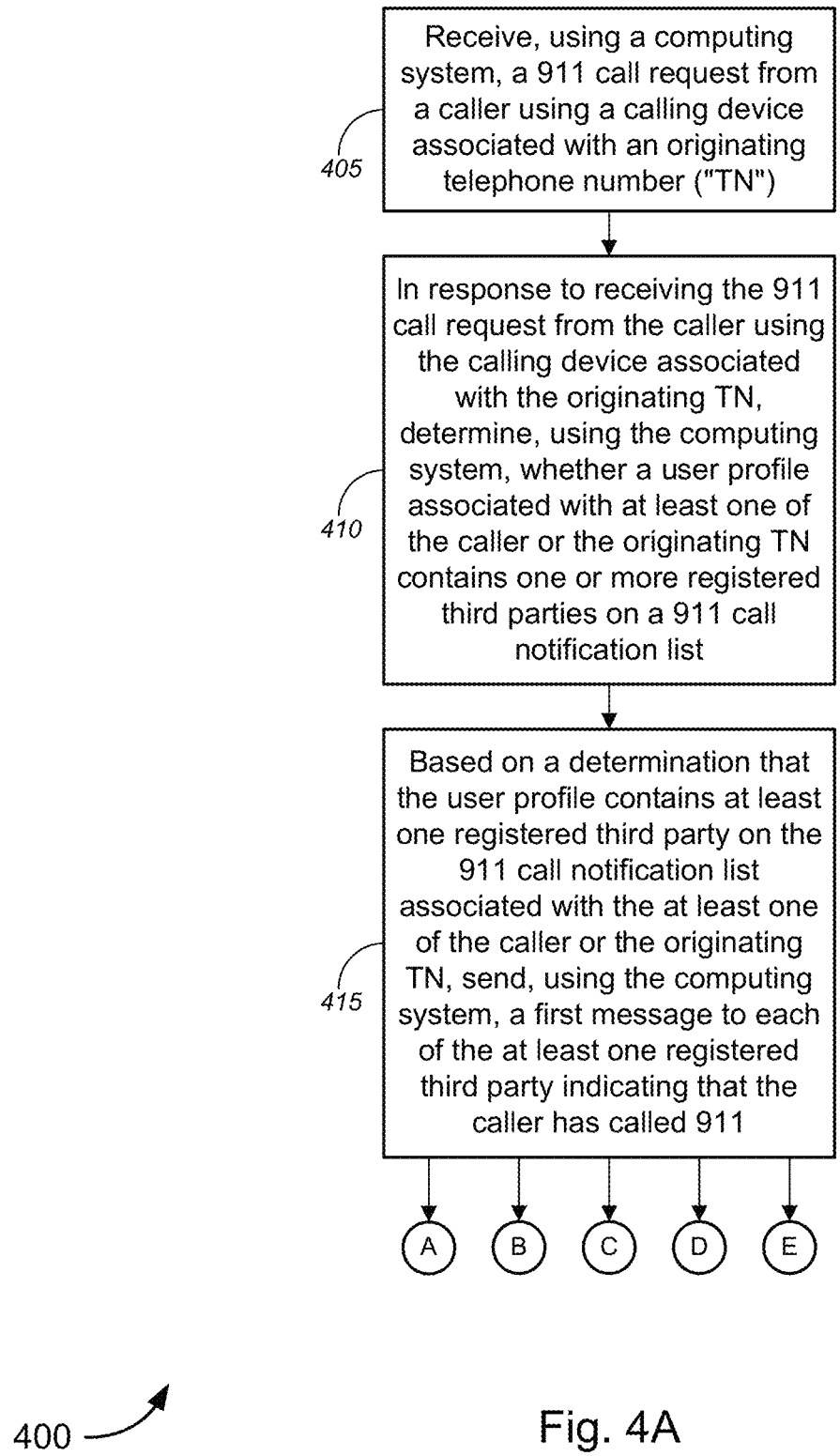

In the non-limiting embodiment of FIG. 4A, method 400, at block 405, may comprise receiving a 911 call request from a caller using a calling device associated with an originating telephone number ("TN"). At block 410, method 400 may comprise, in response to receiving the 911 call request from the caller using the originating TN, determining, using a computing system, whether a user profile associated with at least one of the caller or the originating TN contains one or more registered third parties on a 911 call notification list. Method 400 may further comprise, at block 415, based on a determination that the user profile contains at least one registered third party on the 911 call notification list associated with the at least one of the caller or the originating TN, sending, using the computing system, a first message to each of the at least one registered third party indicating that the caller has called 911. According to some embodiments, sending the first message to each of the at least one registered third party indicating that the caller has called 911 (at block 415) may comprise sending at least one of an e-mail message, a short message service ("SMS") message, a multimedia messaging service ("MMS") message, or a text message to each of the at least one registered third party indicating that the caller has called 911, and/or the like.

In some embodiments, the computing system may include, without limitation, at least one of a call server, a call controller, a call manager, a public safety answering point ("PSAP") computing system, a network service provider computing system, a server computer over a network, a cloud-based computing system, or a distributed computing system, and/or the like.

According to some embodiments, the user profile associated with the at least one of the caller or the originating TN may be accessible and updateable by one or more administrators associated with the originating TN. In some instances, the caller may be an individual. In such cases, the one or more administrators may each include, but is not limited to, at least one of a guardian of the caller, an adult child of the caller, a parent of the caller, a grandparent of the caller, a sibling of the caller, or another relative of the caller, and/or the like. Also in such cases, the one or more registered third parties on the 911 call notification list associated with the at least one of the caller or the originating TN may each include, without limitation, at least one of the one or more administrators, an agent of the caller, a guardian of the caller, an adult child of the caller, a parent of the caller, a grandparent of the caller, a sibling of the caller, another relative of the caller, a friend of the caller, a neighbor of the caller, a doctor of the caller, a pharmacist of the caller, or a language translation service, and/or the like.

Alternatively, the caller may be one of an employee, a contractor, an owner, or a guest or visitor, and/or the like, of an entity associated with the originating TN. In such cases, the one or more administrators may each include, but is not limited to, at least one of security personnel, a head of security, an executive assistant, a manager, an executive officer, a board member, or an owner of the entity, and/or the like. Also in such cases, the one or more registered third parties on the 911 call notification list may each include, without limitation, at least one of the one or more administrators, an agent of the entity, security personnel of the entity, a head of security of the entity, an executive assistant of the entity, a manager of the entity, an executive officer of the entity, a board member of the entity, an owner of the entity, an attorney at a law firm representing the entity, an in-house attorney for the entity, one or more other employees of the entity working at a location associated with the 911 call request, one or more other employees of the entity working at a different location, or one or more other situation responders of the entity (e.g., security personnel who are employed or contracted by the entity and trained to serve similar roles as emergency responders, or personnel who are employed or contracted by the entity and trained to serve similar roles as emergency management agency personnel, or the like), and/or the like.

Figure 4E:
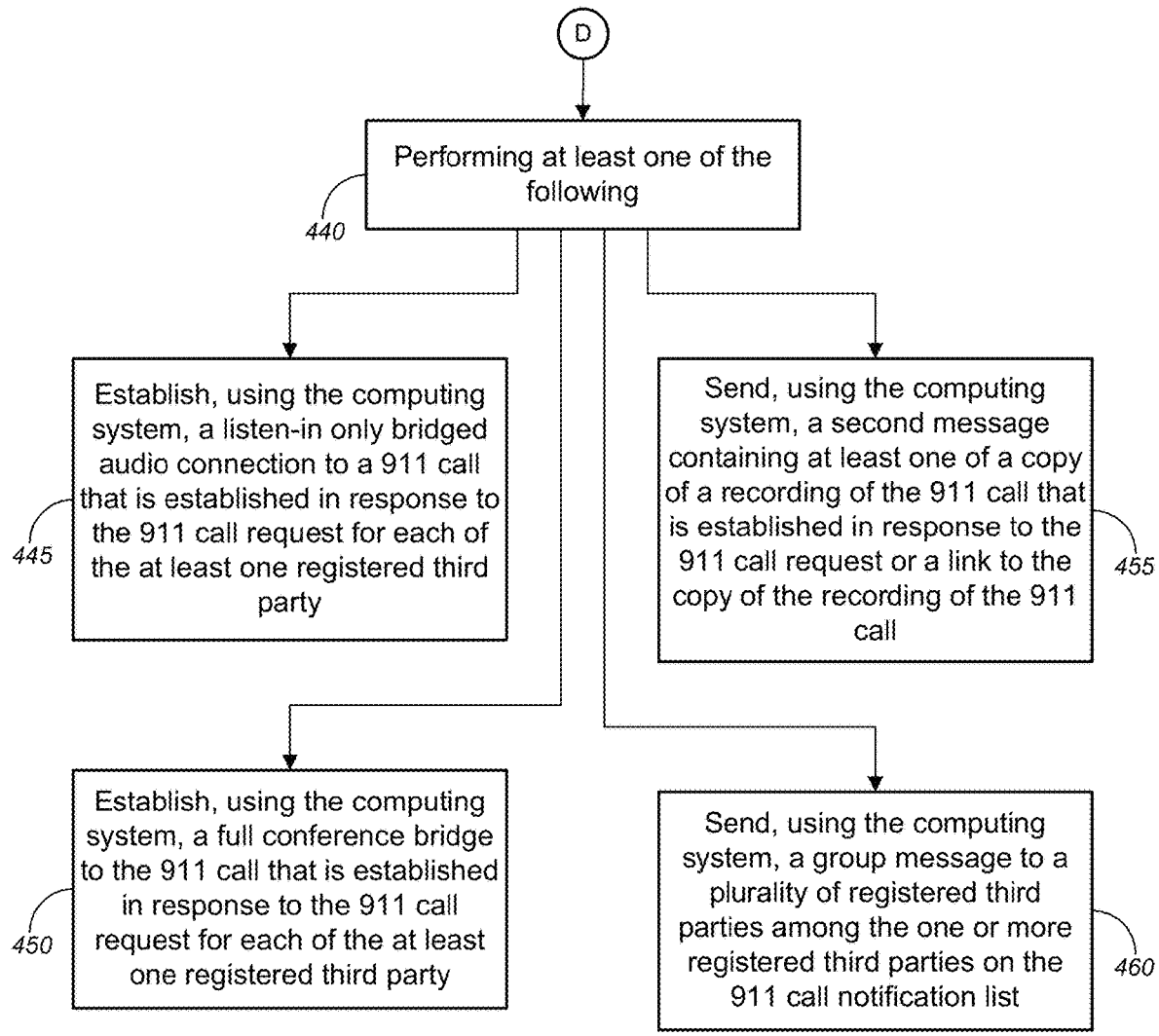
Figure 4F:
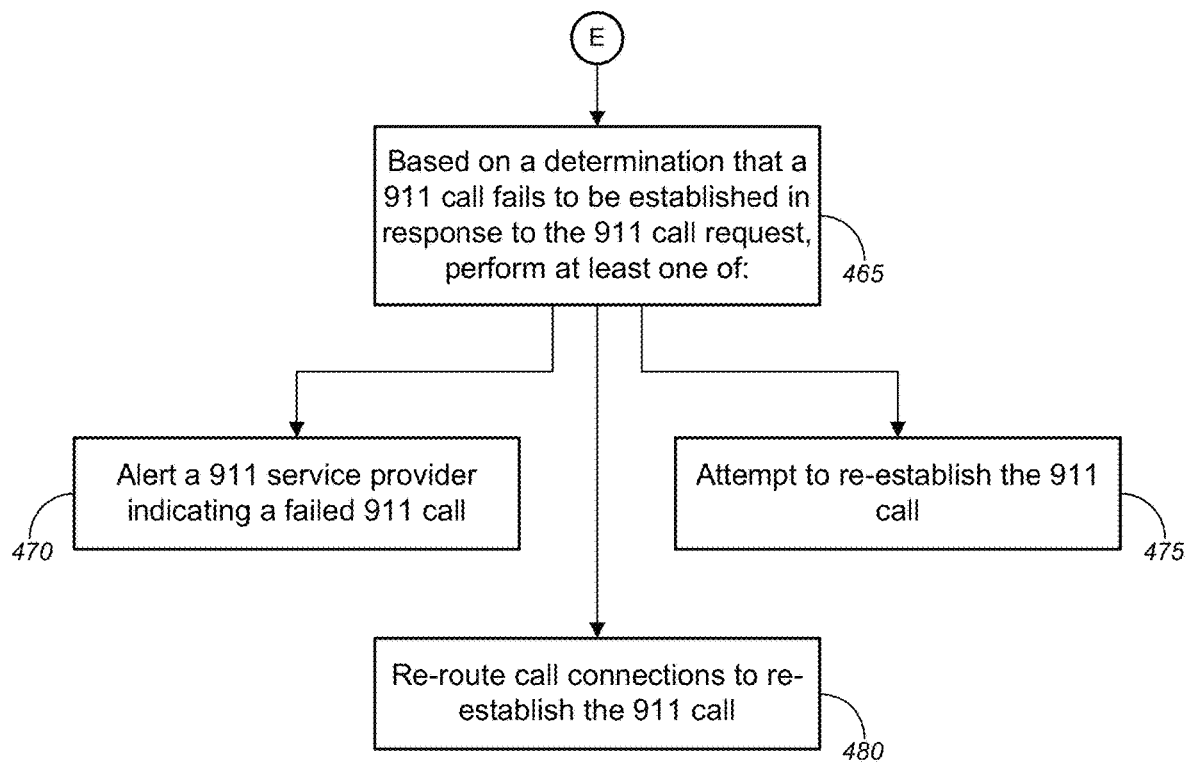

Method 400 may continue onto at least one of the process at block 420 in FIG. 4B following the circular marker denoted, "A," the process at block 425 in FIG. 4C following the circular marker denoted, "B," the process at block 435 in FIG. 4D following the circular marker denoted, "C," the process at block 440 in FIG. 4E following the circular marker denoted, "D," and/or the process at block 465 in FIG. 4F following the circular marker denoted, "E."

At block 420 in FIG. 4B (following the circular marker denoted, "A"), method 400 may comprise providing the one or more administrators with access to information regarding the 911 call request. In some embodiments, the information regarding the 911 call request may include, without limitation, at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access to the information regarding the 911 call request may include, but is not limited to, at least one of access during the 911 call that is established in response to the 911 call request or access after the 911 call that had been established in response to the 911 call request has ended. Alternatively, or additionally, the access information regarding the 911 call request may include, without limitation, at least one of access via a web portal, access via a software application ("app"), or access via an interactive voice response ("IVR") system, and/or the like.

At block 425 in FIG. 4C (following the circular marker denoted, "B"), method 400 may comprise analyzing, using the computing system, a 911 call that is established in response to the 911 call request, using speech recognition functionalities, to identify one or more keywords indicative of information regarding an emergency encountered by the caller; and performing, using the computing system, at least one task (block 430). Merely by way of example, in some cases, the at least one task (at block 430) may include, but is not limited to, at least one of: transcribing the identified one or more keywords and sending the transcribed keywords in a short message service ("SMS") message to each of the at least one registered third party; recording the 911 call and sending a copy of the recording as an attachment in an e-mail message to each of the at least one registered third party; recording the 911 call and sending a link to access the recording in at least one of an e-mail message, a SMS message, a multimedia messaging service ("MMS") message, or a text message to each of the at least one registered third party; transcribing a recording of the 911 call and a copy of the transcript of the recording as an attachment in an e-mail message to each of the at least one registered third party; recording the 911 call and sending a link to access the transcript of the recording in at least one of an e-mail message, a SMS message, a MMS message, or a text message to each of the at least one registered third party;

determining based on the identified one or more keywords that the emergency comprises a medical emergency; determining based on the identified one or more keywords that the emergency comprises a security emergency; or determining based on the identified one or more keywords that the emergency comprises an emergency having legal ramifications; and/or the like.

In some cases, based on a determination that the emergency comprises a medical emergency, the at least one task may further comprise sending, to a medical professional, at least one of: a notification message indicating the medical emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

In some cases, based on a determination that the emergency comprises a security emergency, the at least one task may further comprise sending, to security personnel, at least one of: a notification message indicating the security emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

In some cases, based on a determination that the emergency comprises an emergency having legal ramifications, the at least one task may further comprise sending, to an attorney (either an inhouse attorney or an attorney at a firm representing the caller or the entity), at least one of: a notification message indicating the emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

At block 435 in FIG. 4D (following the circular marker denoted, "C"), method 400 may comprise establishing, using the computing system, a shared communication among the caller, a public safety answering point ("PSAP") dispatcher, and one or more emergency responders. In some instances, the one or more emergency responders may include, but are not limited to, at least one of one or more police officers, one or more firefighters, one or more emergency medical technicians ("EMTs"), one or more paramedics, or one or more language translators, and/or the like. In some cases, the shared communication may include, without limitation, at least one of: a full conference bridge; a group e-mail message; a group short message service ("SMS") message; a group multimedia messaging service ("MMS") message; or a group text message; and/or the like. In some instances, the group e-mail message, the group SMS message, the group MMS message, or the group text message may each include, but is not limited to, at least one of information regarding the caller, information regarding medical status of the caller, information regarding medication needs of the caller, information regarding one or more other individuals at a geographical location associated with at least one of the caller or the originating TN, information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

At block 440 in FIG. 4E (following the circular marker denoted, "D"), method 400 may comprise performing at least one of the following: establishing, using the computing system, a listen-in only bridged audio connection to a 911 call that is established in response to the 911 call request for each of the at least one registered third party (block 445; during which none of the registered third parties may interrupt, or interject during, the 911 call); establishing, using the computing system, a full conference bridge to the 911 call that is established in response to the 911 call request for each of the at least one registered third party (block 450; during which each registered third party may participate in the 911 call); sending, using the computing system, a second message containing at least one of a copy of a recording of the 911 call that is established in response to the 911 call request or a link to the copy of the recording of the 911 call (block 455); or sending, using the computing system, a group message to a plurality of registered third parties among the one or more registered third parties on the 911 call notification list (block 460); and/or the like.

At block 465 in FIG. 4F (following the circular marker denoted, "E"), method 400 may comprise, based on a determination that a 911 call fails to be established in response to the 911 call request, performing at least one of: alerting a 911 service provider indicating a failed 911 call (block 470); attempting to re-establish the 911 call (block 475); or re-routing call connections to re-establish the 911 call (block 480); and/or the like.

Exemplary System and Hardware Implementation

Figure 5:
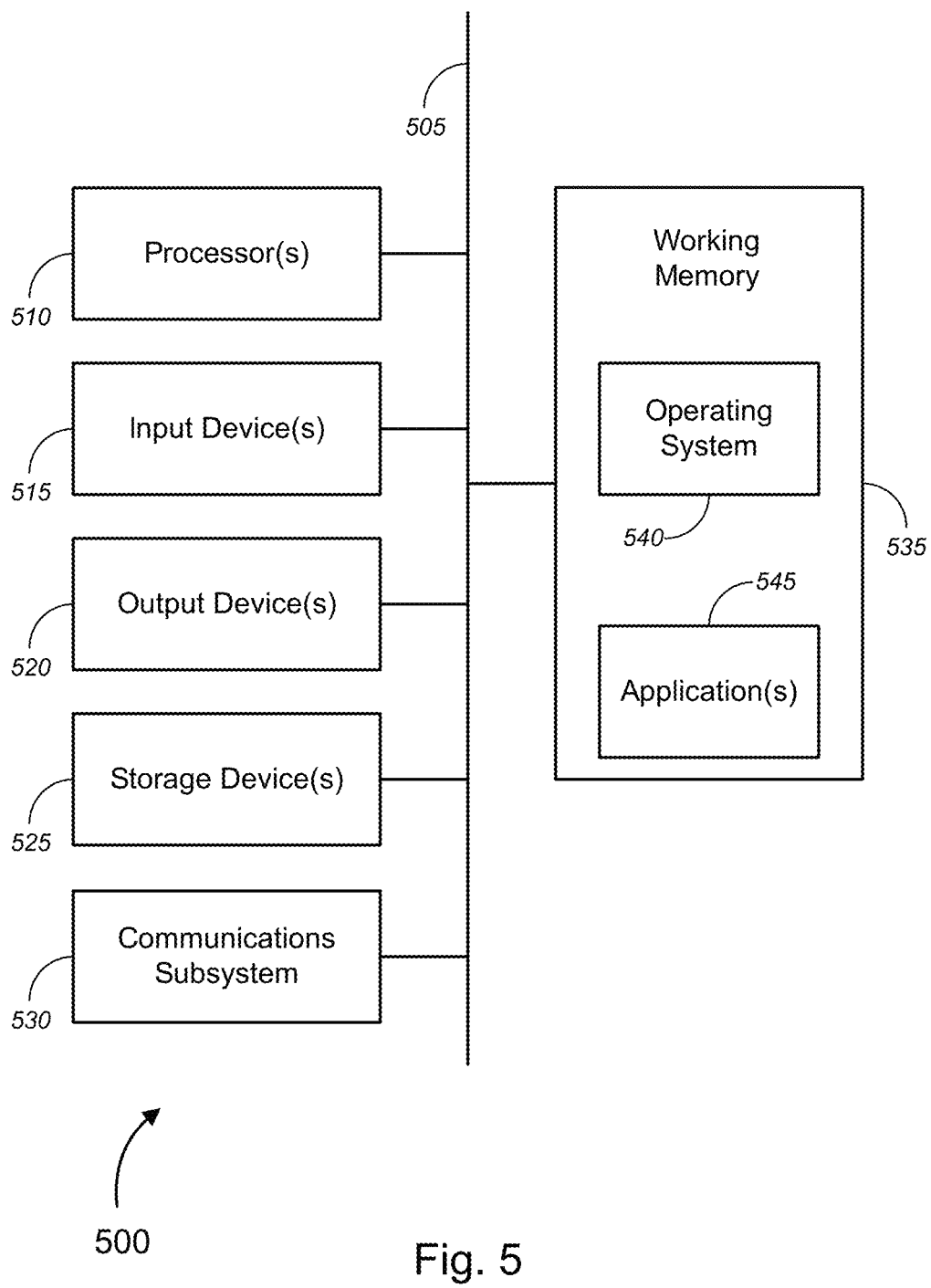
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., calling devices 105 and 105a-105f, computing systems 130, public safety answering point ("PSAP") gateway 140a, PSAP computing system 140b, 911 dispatcher system 145, user devices 150, 160, 170a-170n, 180, 160', 170a'-170n', and 180', and service provider systems 190, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., calling devices 105 and 105a-105f, computing systems 130, PSAP gateway 140a, PSAP computing system 140b, 911 dispatcher system 145, user devices 150, 160, 170a-170n, 180, 160', 170a'-170n', and 180', and service provider systems 190, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
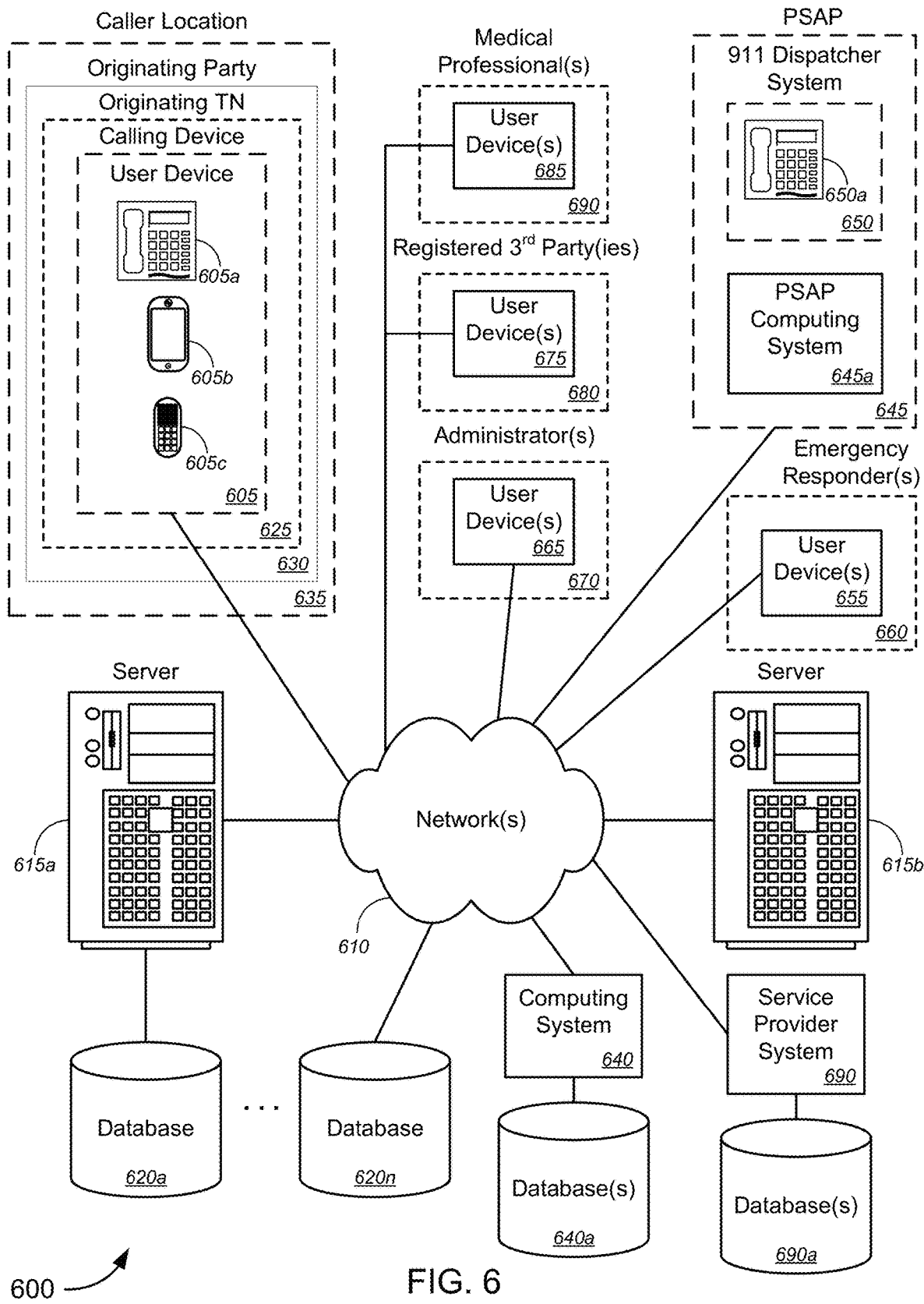
FIG. 6 is a block diagram illustrating a networked system of computers, computing systems, or system hardware architecture, which can be used in accordance with various embodiments.

As noted above, a set of embodiments comprises methods and systems for implementing 911 call functionalities, and, more particularly, to methods, systems, and apparatuses for implementing enhanced 911 call functionalities. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with three user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 125 of FIGS. 1-3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing 911 call functionalities, and, more particularly, to methods, systems, and apparatuses for implementing enhanced 911 call functionalities, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise user devices 605a-605c (similar to calling devices 105 and 105a-105f of FIGS. 1-3, or the like) that may be used as a calling device 605 associated with an originating telephone number ("TN") 625 that is associated with an originating party 630 (similar to originating TNs 110, 110a, 110b, and 110c associated with originating parties 115, 115a, 115b, and 115c, respectively, of FIGS. 1, 2A, 2B, and 3, or the like) and/or with an entity with which the originating party 630 is associated, and that is associated with a caller location 635 (similar to caller location 120 of FIG. 1, or the like). System 600 may further comprise computing system 640 and corresponding database(s) 640a (similar to computing systems 130 and corresponding database(s) 135 of FIGS. 1-3, or the like) and a public safety answering point ("PSAP") 645 (similar to PSAPs 140 of FIGS. 1-3, or the like). The PSAP 645 may comprise a PSAP computing system 645a (similar to PSAP computing systems 140b of FIGS. 1-3, or the like) and a 911 dispatcher system 650 (similar to 911 dispatcher systems 145 of FIGS.

1-3, or the like; which may include a telephone system, a voice over Internet Protocol ("VoIP") phone system, or other voice communications system 650a (similar to voice communications systems 145a of FIGS. 1-3, or the like), or the like). System 600 may further comprise one or more user devices 655 associated with one or more emergency responders 660 (similar to user devices 150 associated with one or more emergency responders 155 of FIGS. 1 and 2, or the like), one or more user devices 665 associated with one or more administrators 670 (similar to user devices 160 and 160' associated with one or more administrators 165 and 165' of FIGS. 1 and 2, or the like), one or more user devices 675 associated with one or more registered third parties 680 (similar to user devices 170a-170n and 170a'-170n' associated with one or more third parties 175a-175n and 175a'-175n' of FIGS. 1 and 2, or the like), one or more user devices 685 associated with one or more medical professionals 690 (similar to user devices 180 and 180' associated with one or more medical professionals 185 and 185' of FIGS. 1 and 2, or the like), and a service provider system 690 and corresponding database(s) 690a (similar to service provider systems 190 and corresponding database(s) 195 of FIGS. 1 and 3, or the like).

In operation, computing system 640 and/or PSAP computing system 645a (collectively, "computing system" or the like) may receive a 911 call request from a caller (e.g., originating party 630, or the like) using a calling device (e.g., calling device 605, or the like) associated with an originating TN (e.g., originating TN 625, or the like). In response to receiving the 911 call request from the caller using the calling device associated with the originating TN, the computing system may determine whether a user profile associated with at least one of the caller or the originating TN contains one or more registered third parties on a 911 call notification list. In some cases, the user profile may be stored on a database(s) (e.g., database(s) 640a, or the like). Based on a determination that the user profile contains at least one registered third party (e.g., registered third parties 680, or the like) on the 911 call notification list associated with the at least one of the caller or the originating TN, the computing system may send a first message to each of the at least one registered third party indicating that the caller has called 911. According to some embodiments, the user profile associated with the at least one of the caller or the originating TN may be accessible and updateable by one or more administrators associated with the originating TN.

In some embodiments, the computing system may provide the one or more administrators (e.g., administrator(s) 670, or the like) with access to at least one of: call records associated with the 911 call request; call records associated with a 911 call that is established in response to the 911 call request; recordings of the 911 call that is established in response to the 911 call request; transcripts of the 911 call that is established in response to the 911 call request; call records associated with previous 911 call requests associated with at least one of the caller or the originating TN; call records associated with previous 911 calls associated with at least one of the caller or the originating TN; recordings of previous 911 calls associated with at least one of the caller or the originating TN; transcripts of previous 911 calls associated with at least one of the caller or the originating TN; or a history of 911 calls associated with at least one of the caller or the originating TN; and/or the like. In some instances, the access may include, without limitation, at least one of access during the 911 call that is established in response to the 911 call request or access after the 911 call that had been established in response to the 911 call request has ended. Alternatively, or additionally, the access may include, but is not limited to, at least one of access via a web portal, access via a software application ("app"), or access via an interactive voice response ("IVR") system, and/or the like.

According to some embodiments, sending the first message to each of the at least one registered third party indicating that the caller has called 911 may comprise sending at least one of an e-mail message, a short message service ("SMS") message, a multimedia messaging service ("MMS") message, or a text message to each of the at least one registered third party indicating that the caller has called 911, and/or the like.

In some embodiments, the computing system may analyze a 911 call that is established in response to the 911 call request, using speech recognition functionalities, to identify one or more keywords indicative of information regarding an emergency encountered by the caller; and may perform at least one of: transcribing the identified one or more keywords and sending the transcribed keywords in a SMS message to each of the at least one registered third party; recording the 911 call and sending a copy of the recording as an attachment in an e-mail message to each of the at least one registered third party; recording the 911 call and sending a link to access the recording in at least one of an e-mail message, a SMS message, a MMS message, or a text message to each of the at least one registered third party; transcribing a recording of the 911 call and a copy of the transcript of the recording as an attachment in an e-mail message to each of the at least one registered third party; recording the 911 call and sending a link to access the transcript of the recording in at least one of an e-mail message, a SMS message, a MMS message, or a text message to each of the at least one registered third party; determining based on the identified one or more keywords that the emergency comprises a medical emergency; determining based on the identified one or more keywords that the emergency comprises a security emergency; or determining based on the identified one or more keywords that the emergency comprises an emergency having legal ramifications; and/or the like.

In some cases, based on a determination that the emergency comprises a medical emergency, the computing system may send, to a medical professional (e.g., medical professional(s) 690, or the like), at least one of: a notification message indicating the medical emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

Alternatively, or additionally, based on a determination that the emergency comprises a security emergency, the computing system may send, to security personnel, at least one of: a notification message indicating the security emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

Alternatively, or additionally, based on a determination that the emergency comprises an emergency having legal ramifications, the computing system may send, to an attorney, at least one of: a notification message indicating the emergency encountered by the caller; the transcribed keywords in a SMS message; a copy of the recording as an attachment in an e-mail message; a link to access the recording in at least one of an e-mail message, a SMS message, a MMS message, or a text message; a copy of the transcript of the recording as an attachment in an e-mail message; or a link to access the transcript of the recording in at least one of an e-mail message, a SMS message, a MMS message, or a text message; and/or the like.

According to some embodiments, the computing system may perform at least one of: establishing a listen-in only bridged audio connection to a 911 call that is established in response to the 911 call request for each of the at least one registered third party; establishing a full conference bridge to the 911 call that is established in response to the 911 call request for each of the at least one registered third party; sending a second message containing at least one of a copy of a recording of the 911 call that is established in response to the 911 call request or a link to the copy of the recording of the 911 call; or sending a group message to a plurality of registered third parties among the one or more registered third parties on the 911 call notification list; and/or the like.

In some embodiments, the computing system may establish a shared communication among the caller (e.g., originating party 630, or the like), a PSAP dispatcher (responding to the 911 call or 911 call request from caller 630 using 911 dispatcher system 650 and/or voice communications system 650a, or the like), and one or more emergency responders (e.g., emergency responder(s) 660, or the like). In some cases, the shared communication may include, but is not limited to, at least one of: a full conference bridge; a group e-mail message; a group SMS message; a group MMS message; or a group text message; and/or the like. In some instances, the group e-mail message, the group SMS message, the group MMS message, or the group text message may each include, without limitation, at least one of information regarding the caller, information regarding medical status of the caller, information regarding medication needs of the caller, information regarding one or more other individuals at a geographical location associated with at least one of the caller or the originating TN (e.g., caller location 635, or the like), information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller, and/or the like.

According to some embodiments, based on a determination that a 911 call fails to be established in response to the 911 call request, the computing system may perform at least one of: alerting a 911 service provider (e.g., service provider system 690, or the like) indicating a failed 911 call; attempting to re-establish the 911 call; or re-routing call connections to re-establish the 911 call; and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
in response to receiving a 911 call request from a caller using a calling device associated with an originating telephone number ("TN"), determining, using a computing system, whether a user profile associated with at least one of the caller or the originating TN contains one or more registered third parties on a 911 call notification list;
transcribing a recording of the 911 call that is established in response to the 911 call request; and
based on a determination that the user profile contains at least one registered third party on the 911 call notification list associated with the at least one of the caller or the originating TN, sending, using the computing system, a first message to each of the at least one registered third party indicating that the caller has called 911, wherein the first message includes a copy of the transcript of the recording.

2. The method of claim 1, wherein the computing system comprises at least one of a call server, a call controller, a call manager, a public safety answering point ("PSAP") computing system, a network service provider computing system, a server computer over a network, a cloud-based computing system, or a distributed computing system.

3. The method of claim 1, wherein the user profile associated with the at least one of the caller or the originating TN is accessible and updateable by one or more administrators associated with the originating TN.

4. The method of claim 3, wherein the caller is an individual, wherein the one or more administrators each comprises at least one of a guardian of the caller, an adult child of the caller, a parent of the caller, a grandparent of the caller, a sibling of the caller, or another relative of the caller, wherein the one or more registered third parties on the 911 call notification list associated with the at least one of the caller or the originating TN each comprises at least one of the one or more administrators, an agent of the caller, a guardian of the caller, an adult child of the caller, a parent of the caller, a grandparent of the caller, a sibling of the caller, another relative of the caller, a friend of the caller, a neighbor of the caller, a doctor of the caller, a pharmacist of the caller, or a language translation service.

5. The method of claim 3, wherein the caller is one of an employee, a contractor, an owner, or a guest or visitor of an entity associated with the originating TN, wherein the one or more administrators each comprises at least one of security personnel, a head of security, an executive assistant, a manager, an executive officer, a board member, or an owner of the entity, wherein the one or more registered third parties on the 911 call notification list each comprises at least one of the one or more administrators, an agent of the entity, security personnel of the entity, a head of security of the entity, an executive assistant of the entity, a manager of the entity, an executive officer of the entity, a board member of the entity, an owner of the entity, an attorney at a law firm representing the entity, an in-house attorney for the entity, one or more other employees of the entity working at a location associated with the 911 call request, one or more other employees of the entity working at a different location, or one or more other situation responders of the entity.

6. The method of claim 3, further comprising:
providing the one or more administrators with access to at least one of:
call records associated with the 911 call request;
call records associated with the 911 call that is established in response to the 911 call request;
recordings of the 911 call that is established in response to the 911 call request;
transcripts of the 911 call that is established in response to the 911 call request;
call records associated with previous 911 call requests associated with at least one of the caller or the originating TN;
call records associated with previous 911 calls associated with at least one of the caller or the originating TN;
recordings of previous 911 calls associated with at least one of the caller or the originating TN;
transcripts of previous 911 calls associated with at least one of the caller or the originating TN; or
a history of 911 calls associated with at least one of the caller or the originating TN.

7. The method of claim 6, wherein the access comprises at least one of access during the 911 call that is established in response to the 911 call request or access after the 911 call that had been established in response to the 911 call request has ended.

8. The method of claim 6, wherein the access comprises at least one of access via a web portal, access via a software application ("app"), or access via an interactive voice response ("IVR") system.

9. The method of claim 1, wherein sending the first message to each of the at least one registered third party indicating that the caller has called 911 comprises sending at least one of an e-mail message, a short message service ("SMS") message, a multimedia messaging service ("MMS") message, or a text message to each of the at least one registered third party indicating that the caller has called 911.

10. The method of claim 1, further comprising:
analyzing, using the computing system, the 911 call that is established in response to the 911 call request, using speech recognition functionalities, to identify one or more keywords indicative of information regarding an emergency encountered by the caller;
performing, using the computing system, at least one of:
transcribing the identified one or more keywords and sending the transcribed keywords in a short message service ("SMS") message to each of the at least one registered third party;
recording the 911 call and sending a copy of the recording as an attachment in an e-mail message to each of the at least one registered third party;
recording the 911 call and sending a link to access the recording in at least one of an e-mail message, a SMS message, a multimedia messaging service ("MMS") message, or a text message to each of the at least one registered third party;
recording the 911 call and sending a link to access the transcript of the recording in at least one of an e-mail message, a SMS message, a MMS message, or a text message to each of the at least one registered third party;
determining based on the identified one or more keywords that the emergency comprises a medical emergency and sending, to a medical professional, at least one of:
a notification message indicating the medical emergency encountered by the caller;
the transcribed keywords in a SMS message;
a copy of the recording as an attachment in an e-mail message;
a link to access the recording in at least one of an e-mail message, a SMS message, a MMS message, or a text message;
a copy of the transcript of the recording as an attachment in an e-mail message; or
a link to access the transcript of the recording in at least one of an e-mail message, a SMS message, a MMS message, or a text message;
determining based on the identified one or more keywords that the emergency comprises a security emergency and sending, to security personnel, at least one of:
a notification message indicating the security emergency encountered by the caller;
the transcribed keywords in a SMS message;
a copy of the recording as an attachment in an e-mail message;
a link to access the recording in at least one of an e-mail message, a SMS message, a MMS message, or a text message;
a copy of the transcript of the recording as an attachment in an e-mail message; or
a link to access the transcript of the recording in at least one of an e-mail message, a SMS message, a MMS message, or a text message;
determining based on the identified one or more keywords that the emergency comprises an emergency having legal ramifications and sending, to an attorney, at least one of:
a notification message indicating the emergency encountered by the caller;

the transcribed keywords in a SMS message;
a copy of the recording as an attachment in an e-mail message;
a link to access the recording in at least one of an e-mail message, a SMS message, a MMS message, or a text message;
a copy of the transcript of the recording as an attachment in an e-mail message; or
a link to access the transcript of the recording in at least one of an e-mail message, a SMS message, a MMS message, or a text message.

11. The method of claim 1, further comprising at least one of:
establishing, using the computing system, a listen-in only bridged audio connection to the 911 call that is established in response to the 911 call request for each of the at least one registered third party;
establishing, using the computing system, a full conference bridge to the 911 call that is established in response to the 911 call request for each of the at least one registered third party;
sending, using the computing system, a second message containing at least one of a copy of a recording of the 911 call that is established in response to the 911 call request or a link to the copy of the recording of the 911 call; or
sending, using the computing system, a group message to a plurality of registered third parties among the one or more registered third parties on the 911 call notification list.

12. The method of claim 1, further comprising:
establishing, using the computing system, a shared communication among the caller, a public safety answering point ("PSAP") dispatcher, and one or more emergency responders, wherein the one or more emergency responders comprises at least one of one or more police officers, one or more firefighters, one or more emergency medical technicians ("EMTs"), one or more paramedics, or one or more language translators.

13. The method of claim 12, wherein the shared communication comprises at least one of:
a full conference bridge;
a group e-mail message;
a group short message service ("SMS") message;
a group multimedia messaging service ("MMS") message; or
a group text message;
wherein the group e-mail message, the group SMS message, the group MMS message, or the group text message each comprises at least one of information regarding the caller, information regarding medical status of the caller, information regarding medication needs of the caller, information regarding one or more other individuals at a geographical location associated with at least one of the caller or the originating TN, information regarding medical status of the one or more other individuals, information regarding medication needs of the one or more other individuals, information regarding the geographical location associated with at least one of the caller or the originating TN, information regarding buildings or structures at the geographical location associated with at least one of the caller or the originating TN, or information regarding an emergency encountered by the caller.

14. The method of claim 1, further comprising, based on a determination that a 911 call fails to be established in response to the 911 call request, performing at least one of:
alerting a 911 service provider indicating a failed 911 call;
attempting to re-establish the 911 call; or
re-routing call connections to re-establish the 911 call.

15. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
in response to receiving a 911 call request from a caller using a calling device associated with an originating telephone number ("TN"), determine whether a user profile associated with at least one of the caller or the originating TN contains one or more registered third parties on a 911 call notification list;
transcribe a recording of the 911 call that is established in response to the 911 call request; and
based on a determination that the user profile contains at least one registered third party on the 911 call notification list associated with the at least one of the caller or the originating TN, send a first message to each of the at least one registered third party indicating that the caller has called 911, wherein the first message includes a copy of the transcript of the recording.

16. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
in response to receiving a 911 call request from a caller using a calling device associated with an originating telephone number ("TN"), determine whether a user profile associated with at least one of the caller or the originating TN contains one or more registered third parties on a 911 call notification list;
transcribe a recording of the 911 call that is established in response to the 911 call request; and
based on a determination that the user profile contains at least one registered third party on the 911 call notification list associated with the at least one of the caller or the originating TN, send a first message to each of the at least one registered third party indicating that the caller has called 911, wherein the first message includes a copy of the transcript of the recording.

17. The system of claim 16, wherein the computing system comprises at least one of a call server, a call controller, a call manager, a public safety answering point ("PSAP") computing system, a network service provider computing system, a server computer over a network, a cloud-based computing system, or a distributed computing system.

18. The system of claim 16, wherein sending the first message to each of the at least one registered third party indicating that the caller has called 911 comprises sending at least one of an e-mail message, a short message service ("SMS") message, a multimedia messaging service ("MMS") message, or a text message to each of the at least one registered third party indicating that the caller has called 911.

19. The system of claim 16, wherein the first set of instructions, when executed by the at least one first processor, further causes the computing system to perform at least one of:
- establish a listen-in only bridged audio connection to a 911 call that is established in response to the 911 call request for each of the at least one registered third party;
- establish a full conference bridge to the 911 call that is established in response to the 911 call request for each of the at least one registered third party;
- send a second message containing at least one of a copy of a recording of the 911 call that is established in response to the 911 call request or a link to the copy of the recording of the 911 call; or
- send a group message to a plurality of registered third parties among the one or more registered third parties on the 911 call notification list.

20. The system of claim 16, wherein the first set of instructions, when executed by the at least one first processor, further causes the computing system to:
- establish a shared communication among the caller, a public safety answering point ("PSAP") dispatcher, and one or more emergency responders, wherein the one or more emergency responders comprises at least one of one or more police officers, one or more firefighters, one or more emergency medical technicians ("EMTs"), one or more paramedics, or one or more language translators.

* * * * *